US011100690B2

(12) United States Patent
Lanahan et al.

(10) Patent No.: US 11,100,690 B2
(45) Date of Patent: Aug. 24, 2021

(54) SYSTEM AND METHODS FOR AUTOMATIC MEDIA POPULATION OF A STYLE PRESENTATION

(71) Applicant: eBay Inc., San Jose, CA (US)

(72) Inventors: James W. Lanahan, San Jose, CA (US); Dane M. Howard, San Jose, CA (US); Brian F. Williams, San Jose, CA (US); Luke Peacock, San Jose, CA (US); Belmer Perrella Garcia Negrillo, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/452,474

(22) Filed: Mar. 7, 2017

(65) Prior Publication Data
US 2017/0199847 A1    Jul. 13, 2017

Related U.S. Application Data

(63) Continuation of application No. 14/149,140, filed on Jan. 7, 2014, now Pat. No. 9,613,006, which is a (Continued)

(51) Int. Cl.
*G06F 40/103*    (2020.01)
*G06F 3/0482*    (2013.01)
(Continued)

(52) U.S. Cl.
CPC ............ *G06T 11/60* (2013.01); *G06F 3/0482* (2013.01); *G06F 3/04817* (2013.01); *G06F 16/2428* (2019.01); *G06F 16/285* (2019.01);

*G06F 16/3344* (2019.01); *G06F 16/43* (2019.01); *G06F 16/435* (2019.01);
(Continued)

(58) Field of Classification Search
CPC ...... G06F 17/24; G06F 3/0482; G06F 40/106; G06F 40/186
See application file for complete search history.

(56) References Cited

U.S. PATENT DOCUMENTS 5,541,662 A    6/1996 Adams
5,539,871 A    7/1996 Gibson
(Continued)

FOREIGN PATENT DOCUMENTS

JP    2008-183330    8/2008
WO    2000/007110    2/2000
(Continued)

OTHER PUBLICATIONS

US 10,108,583 B2, 10/2018, Lanahan et al. (withdrawn)
(Continued)

*Primary Examiner* — Scott T Baderman
*Assistant Examiner* — Mario M Velez-Lopez
(74) *Attorney, Agent, or Firm* — Faegre Drinker

(57) ABSTRACT

A method for automatic media population of a style presentation comprises collecting presentation media; positioning the collected presentation media on a storyboard; and selecting a style presentation; wherein the selection of the style presentation results in the automatic population of the style presentation with the presentation media positioned on the storyboard is described herein.

20 Claims, 10 Drawing Sheets

Related U.S. Application Data continuation of application No. 12/347,749, filed on Dec. 31, 2008, now Pat. No. 8,627,192.

(60) Provisional application No. 61/078,288, filed on Jul. 3, 2008.

(51) Int. Cl.

| | | |
|---|---|---|
| *G06T 11/60* | (2006.01) | |
| *G06F 16/43* | (2019.01) | |
| *G06F 16/44* | (2019.01) | |
| *G06F 16/28* | (2019.01) | |
| *G06F 16/435* | (2019.01) | |
| *G06F 16/438* | (2019.01) | |
| *G06F 16/242* | (2019.01) | |
| *G06F 16/33* | (2019.01) | |
| *G06F 16/9535* | (2019.01) | |
| *G06F 16/957* | (2019.01) | |
| *G06F 40/169* | (2020.01) | |
| *G06F 40/106* | (2020.01) | |
| *G06F 40/166* | (2020.01) | |
| *G06F 40/134* | (2020.01) | |
| *G06F 40/143* | (2020.01) | |
| *G06F 3/0481* | (2013.01) | |
| *G06Q 30/02* | (2012.01) | |

(52) U.S. Cl.
CPC ............ *G06F 16/438* (2019.01); *G06F 16/44* (2019.01); *G06F 16/9535* (2019.01); *G06F 16/9577* (2019.01); *G06F 40/103* (2020.01); *G06F 40/106* (2020.01); *G06F 40/134* (2020.01); *G06F 40/143* (2020.01); *G06F 40/166* (2020.01); *G06F 40/169* (2020.01); *G06Q 30/02* (2013.01); *G06T 2200/24* (2013.01)

(56) References Cited

U.S. PATENT DOCUMENTS

| | | | |
|---|---|---|---|
| 5,559,942 A | 9/1996 | Gough et al. | |
| 5,578,808 A | 11/1996 | Taylor | |
| 5,666,554 A * | 9/1997 | Tanaka | G06T 1/00 715/203 |
| 5,708,845 A | 1/1998 | Wistendahl et al. | |
| 5,844,557 A | 12/1998 | Shively, II | |
| 5,860,073 A | 1/1999 | Ferrel | |
| 5,918,012 A | 6/1999 | Astiz et al. | |
| 5,933,817 A | 8/1999 | Hucal | |
| 6,008,807 A | 12/1999 | Bretschneider et al. | |
| 6,038,552 A | 3/2000 | Fleischi et al. | |
| 6,085,249 A | 7/2000 | Wang | |
| 6,097,389 A | 8/2000 | Morris et al. | |
| 6,259,457 B1 | 7/2001 | Davies | |
| 6,397,196 B1 | 5/2002 | Kravetz et al. | |
| 6,470,100 B2 | 10/2002 | Horiuschi | |
| 6,515,656 B1 | 2/2003 | Wittenburg | |
| 6,647,383 B1 | 11/2003 | August et al. | |
| 6,751,776 B1 | 6/2004 | Gong | |
| 6,769,095 B1 | 7/2004 | Brassard | |
| 6,789,060 B1 * | 9/2004 | Wolfe | G06F 40/186 704/235 |
| 6,834,282 B1 | 12/2004 | Bonneau | |
| 6,928,610 B2 | 8/2005 | Brintzenhofe et al. | |
| 7,023,452 B2 | 4/2006 | Oshiyama | |
| 7,181,468 B2 | 2/2007 | Spring et al. | |
| 7,237,185 B1 | 6/2007 | Sequeira | |
| 7,276,290 B2 | 10/2007 | Anderson et al. | |
| 7,296,242 B2 | 11/2007 | Agata et al. | |
| 7,376,290 B2 | 5/2008 | Anderson et al. | |
| 7,409,543 B1 | 8/2008 | Bjorn | |
| 7,469,380 B2 | 12/2008 | Wessling et al. | |
| 7,502,795 B1 | 3/2009 | Svendsen et al. | |
| 7,546,554 B2 | 6/2009 | Chiu et al. | |
| 7,573,486 B2 | 8/2009 | Mondry | |
| 7,576,555 B2 | 8/2009 | Hashimoto | |
| 7,576,755 B2 | 8/2009 | Sun et al. | |
| RE41,210 E | 4/2010 | Wang | |
| 7,725,494 B2 | 5/2010 | Rogers et al. | |
| 7,752,548 B2 | 7/2010 | Mercer | |
| 7,768,535 B2 * | 8/2010 | Reid | G06T 11/60 345/660 |
| 7,805,382 B2 | 9/2010 | Rosen et al. | |
| 7,814,560 B2 | 10/2010 | Bellagamba et al. | |
| 7,836,110 B1 | 11/2010 | Schoenbach et al. | |
| 7,885,951 B1 | 2/2011 | Rothschild | |
| 7,885,955 B2 | 2/2011 | Hull et al. | |
| 7,982,909 B2 | 7/2011 | Beato | |
| 8,006,192 B1 | 8/2011 | Reid et al. | |
| 8,010,629 B2 | 8/2011 | Williams et al. | |
| 8,024,658 B1 * | 9/2011 | Fagans | G06Q 30/0621 715/243 |
| 8,082,328 B2 | 12/2011 | Hull et al. | |
| 8,103,546 B1 | 1/2012 | De Jardins | |
| 8,121,902 B1 | 2/2012 | Desjardins | |
| 8,131,114 B2 * | 3/2012 | Wang | H04N 1/00453 382/284 |
| 8,180,178 B2 * | 5/2012 | Cheatle | G06K 9/00234 382/298 |
| 8,316,084 B2 | 11/2012 | Lanahan et al. | |
| 8,365,092 B2 | 1/2013 | Lanahan et al. | |
| 8,560,565 B2 | 10/2013 | Howard et al. | |
| 8,620,893 B2 | 12/2013 | Howard et al. | |
| 8,627,192 B2 | 1/2014 | Lanahan et al. | |
| 8,667,160 B1 | 3/2014 | Haot et al. | |
| 8,789,094 B1 | 7/2014 | Singh | |
| 8,799,952 B2 | 8/2014 | Gossweiler | |
| 8,812,945 B2 | 8/2014 | Sidon | |
| 8,893,015 B2 | 11/2014 | Lanahan et al. | |
| 9,043,726 B2 | 5/2015 | Lanahan et al. | |
| 9,058,765 B1 * | 6/2015 | Mallick | G06F 3/0482 |
| 9,165,388 B2 * | 10/2015 | Delia | G06T 11/60 |
| 9,430,448 B2 | 8/2016 | Howard et al. | |
| 9,613,006 B2 | 4/2017 | Lanahan et al. | |
| 9,639,505 B2 | 5/2017 | Lanahan et al. | |
| 9,658,754 B2 | 5/2017 | Lanahan et al. | |
| 10,157,170 B2 | 12/2018 | Howard et al. | |
| 10,282,391 B2 | 5/2019 | Lanahan et al. | |
| 10,706,222 B2 | 7/2020 | Lanahan et al. | |
| 10,853,555 B2 | 12/2020 | Lanahan et al. | |
| 11,017,160 B2 | 5/2021 | Lanahan et al. | |
| 2001/0034740 A1 | 10/2001 | Kerne | |
| 2001/0044825 A1 | 11/2001 | Barritz | |
| 2001/0044835 A1 | 11/2001 | Schnober | |
| 2001/0050681 A1 | 12/2001 | Keys et al. | |
| 2002/0023111 A1 | 2/2002 | Arora et al. | |
| 2002/0080165 A1 | 6/2002 | Wakefield | |
| 2002/0083178 A1 | 6/2002 | Brothers | |
| 2002/0091600 A1 | 7/2002 | Kravetz et al. | |
| 2002/0108122 A1 | 8/2002 | Alao et al. | |
| 2002/0112093 A1 | 8/2002 | Slotznick | |
| 2002/0135621 A1 | 9/2002 | Angiulo et al. | |
| 2002/0138428 A1 | 9/2002 | Spear | |
| 2002/0152233 A1 * | 10/2002 | Cheong | G06F 16/40 715/202 |
| 2002/0164151 A1 | 11/2002 | Jasinschi | |
| 2002/0180803 A1 | 12/2002 | Kaplan | |
| 2003/0014510 A1 | 1/2003 | Avvari et al. | |
| 2003/0046222 A1 | 3/2003 | Bard et al. | |
| 2003/0098877 A1 | 5/2003 | Boegelund | |
| 2003/0149983 A1 | 8/2003 | Markel | |
| 2004/0008226 A1 | 1/2004 | Manolis et al. | |
| 2004/0054579 A1 | 3/2004 | Lamb et al. | |
| 2004/0083080 A1 | 4/2004 | Reghetti et al. | |
| 2004/0091232 A1 | 5/2004 | Thomas | |
| 2004/0097232 A1 | 5/2004 | Haverinen | |
| 2004/0143796 A1 | 7/2004 | Lerner et al. | |
| 2004/0184778 A1 * | 9/2004 | Jung | G11B 27/034 386/241 |
| 2004/0199574 A1 | 10/2004 | Franco et al. | |
| 2004/0001106 A1 | 12/2004 | Deutscher et al. | |

(56) References Cited

U.S. PATENT DOCUMENTS

| | | | |
|---|---|---|---|
| 2004/0268224 A1 | 12/2004 | Balkus et al. | |
| 2005/0007382 A1* | 1/2005 | Schowtka | G06T 3/40 |
| | | | 345/619 |
| 2005/0069225 A1 | 3/2005 | Schneider et al. | |
| 2005/0094014 A1 | 5/2005 | Haas et al. | |
| 2005/0114356 A1 | 5/2005 | Bhatti | |
| 2005/0114754 A1 | 5/2005 | Miller et al. | |
| 2005/0114784 A1 | 5/2005 | Spring et al. | |
| 2005/0138193 A1 | 6/2005 | Encarnacion et al. | |
| 2005/0149970 A1 | 7/2005 | Fairhurst et al. | |
| 2005/0228749 A1 | 10/2005 | Lozano | |
| 2005/0234981 A1* | 10/2005 | Manousos | H04N 1/00132 |
| 2005/0235201 A1 | 10/2005 | Brown et al. | |
| 2005/0237952 A1 | 10/2005 | Punj | |
| 2005/0268227 A1 | 12/2005 | Carlson | |
| 2005/0268279 A1* | 12/2005 | Paulsen | G06F 8/38 |
| | | | 717/110 |
| 2005/0273693 A1 | 12/2005 | Peterson | |
| 2006/0010162 A1 | 1/2006 | Stevens | |
| 2006/0036949 A1 | 2/2006 | Moore | |
| 2006/0061595 A1 | 3/2006 | Goede et al. | |
| 2006/0064642 A1 | 3/2006 | Iyer | |
| 2006/0069989 A1 | 3/2006 | Jones | |
| 2006/0070005 A1 | 3/2006 | Gilbert et al. | |
| 2006/0086843 A1 | 4/2006 | Lin et al. | |
| 2006/0089843 A1 | 4/2006 | Flather | |
| 2006/0106693 A1 | 5/2006 | Carlson et al. | |
| 2006/0112081 A1 | 5/2006 | Qureshi | |
| 2006/0114510 A1 | 6/2006 | Maeng | |
| 2006/0123455 A1 | 6/2006 | Pai et al. | |
| 2006/0129917 A1 | 6/2006 | Volk et al. | |
| 2006/0181736 A1 | 8/2006 | Quek et al. | |
| 2006/0184574 A1 | 8/2006 | Wu et al. | |
| 2006/0193008 A1 | 8/2006 | Osaka | |
| 2006/0195789 A1 | 8/2006 | Rogers et al. | |
| 2006/0203294 A1 | 9/2006 | Makino | |
| 2006/0206811 A1* | 9/2006 | Dowdy | G09F 23/00 |
| | | | 715/201 |
| 2006/0209214 A1 | 9/2006 | Fader et al. | |
| 2006/0230332 A1* | 10/2006 | Lin | H04N 7/142 |
| | | | 715/203 |
| 2006/0256739 A1 | 11/2006 | Seier et al. | |
| 2006/0271691 A1* | 11/2006 | Jacobs | H04N 1/00132 |
| | | | 709/228 |
| 2006/0277482 A1 | 12/2006 | Hoffman et al. | |
| 2006/0287989 A1 | 12/2006 | Glance | |
| 2007/0016930 A1 | 1/2007 | Wesemann | |
| 2007/0033059 A1* | 2/2007 | Adkins | G06Q 30/02 |
| | | | 705/1.1 |
| 2007/0038931 A1 | 2/2007 | Allaire | |
| 2007/0050718 A1* | 3/2007 | Moore | G11B 27/034 |
| | | | 715/744 |
| 2007/0061266 A1 | 3/2007 | Moore | |
| 2007/0061715 A1 | 3/2007 | Chartier et al. | |
| 2007/0070066 A1 | 3/2007 | Bakhash | |
| 2007/0074110 A1 | 3/2007 | Miksovsky et al. | |
| 2007/0078989 A1 | 4/2007 | Van Datta et al. | |
| 2007/0089057 A1 | 4/2007 | Kindig | |
| 2007/0113250 A1 | 5/2007 | Logan et al. | |
| 2007/0118801 A1 | 5/2007 | Harshbarger et al. | |
| 2007/0130177 A1* | 6/2007 | Schneider | G06F 17/30017 |
| 2007/0136194 A1 | 6/2007 | Sloan | |
| 2007/0136244 A1 | 6/2007 | Maclaurin et al. | |
| 2007/0156382 A1 | 7/2007 | Graham | |
| 2007/0156434 A1 | 7/2007 | Martin et al. | |
| 2007/0162853 A1 | 7/2007 | Weber et al. | |
| 2007/0162856 A1 | 7/2007 | Schlossberg | |
| 2007/0186182 A1 | 8/2007 | Schiller | |
| 2007/0204208 A1 | 8/2007 | Cheng et al. | |
| 2007/0204209 A1 | 8/2007 | Truelove et al. | |
| 2007/0239770 A1 | 10/2007 | Enock et al. | |
| 2007/0245243 A1 | 10/2007 | Lanza et al. | |
| 2007/0253028 A1 | 11/2007 | Widdowson | |
| 2007/0262995 A1 | 11/2007 | Tran | |
| 2008/0005282 A1 | 1/2008 | Gaedcke | |
| 2008/0005669 A1 | 1/2008 | Eilertsen et al. | |
| 2008/0021829 A1 | 1/2008 | Kranzley | |
| 2008/0027798 A1 | 1/2008 | Ramamurthi et al. | |
| 2008/0034295 A1 | 2/2008 | Kulas | |
| 2008/0040683 A1 | 2/2008 | Walsh | |
| 2008/0046406 A1 | 2/2008 | Seide et al. | |
| 2008/0077530 A1 | 3/2008 | Banas | |
| 2008/0081662 A1 | 4/2008 | Strandell et al. | |
| 2008/0086688 A1 | 4/2008 | Chandratillake | |
| 2008/0086689 A1 | 4/2008 | Berkley et al. | |
| 2008/0092054 A1 | 4/2008 | Bhumkar et al. | |
| 2008/0120278 A1 | 5/2008 | Roe et al. | |
| 2008/0120550 A1* | 5/2008 | Oakley | G11B 27/034 |
| | | | 715/723 |
| 2008/0126191 A1 | 5/2008 | Schiavi | |
| 2008/0134018 A1 | 6/2008 | Kembel et al. | |
| 2008/0165960 A1 | 7/2008 | Woo | |
| 2008/0195477 A1 | 8/2008 | Kennedy | |
| 2008/0195962 A1* | 8/2008 | Lin | G06F 17/30017 |
| | | | 715/771 |
| 2008/0205694 A1* | 8/2008 | Sagoo | G06T 11/60 |
| | | | 382/100 |
| 2008/0215680 A1 | 9/2008 | Salesky et al. | |
| 2008/0215985 A1 | 9/2008 | Batchelder et al. | |
| 2008/0222560 A1* | 9/2008 | Harrison | G06F 3/04847 |
| | | | 715/800 |
| 2008/0244740 A1 | 10/2008 | Hicks et al. | |
| 2008/0270905 A1* | 10/2008 | Goldman | G06F 9/453 |
| | | | 715/721 |
| 2008/0276279 A1 | 11/2008 | Gossweiler et al. | |
| 2008/0288460 A1 | 11/2008 | Poniatowski et al. | |
| 2008/0301546 A1 | 12/2008 | Moore et al. | |
| 2008/0306995 A1 | 12/2008 | Newell et al. | |
| 2009/0007023 A1 | 1/2009 | Sundstrom | |
| 2009/0037449 A1 | 2/2009 | Fagans et al. | |
| 2009/0083161 A1 | 3/2009 | Mital | |
| 2009/0087161 A1 | 4/2009 | Roberts et al. | |
| 2009/0119256 A1 | 5/2009 | Waters | |
| 2009/0132415 A1 | 5/2009 | Davis et al. | |
| 2009/0138320 A1* | 5/2009 | Schmidt | G06Q 10/06 |
| | | | 705/14.4 |
| 2009/0177546 A1 | 7/2009 | Dijk et al. | |
| 2009/0182810 A1 | 7/2009 | Higgins et al. | |
| 2009/0210391 A1 | 8/2009 | Hall et al. | |
| 2009/0254515 A1 | 10/2009 | Terheggen et al. | |
| 2009/0271283 A1 | 10/2009 | Fosnacht et al. | |
| 2009/0276425 A1 | 11/2009 | Phillips et al. | |
| 2009/0292681 A1 | 11/2009 | Wood et al. | |
| 2009/0319530 A1 | 12/2009 | Hoertnagl | |
| 2010/0005066 A1 | 1/2010 | Howard et al. | |
| 2010/0005067 A1 | 1/2010 | Howard et al. | |
| 2010/0005068 A1 | 1/2010 | Howard et al. | |
| 2010/0005119 A1 | 1/2010 | Howard et al. | |
| 2010/0005139 A1 | 1/2010 | Lanahan et al. | |
| 2010/0005379 A1 | 1/2010 | Lanahan et al. | |
| 2010/0005380 A1 | 1/2010 | Lanahan et al. | |
| 2010/0005397 A1 | 1/2010 | Lanahan et al. | |
| 2010/0005408 A1 | 1/2010 | Lanahan et al. | |
| 2010/0005417 A1 | 1/2010 | Lanahan et al. | |
| 2010/0005498 A1 | 1/2010 | Lanaha | |
| 2010/0023849 A1 | 1/2010 | Hakim et al. | |
| 2010/0036812 A1 | 2/2010 | Choi et al. | |
| 2010/0042628 A1 | 2/2010 | Crowley et al. | |
| 2010/0083077 A1 | 4/2010 | Paulsen et al. | |
| 2010/0083303 A1 | 4/2010 | Redei et al. | |
| 2010/0115410 A1 | 5/2010 | Fu et al. | |
| 2010/0162375 A1 | 6/2010 | Tiu | |
| 2010/0281386 A1 | 11/2010 | Lyons et al. | |
| 2010/0332565 A1 | 12/2010 | Al-Shaykh et al. | |
| 2011/0022966 A1 | 1/2011 | Rose | |
| 2011/0060979 A1 | 3/2011 | O'Brien-Strain | |
| 2011/0285748 A1 | 11/2011 | Slatter et al. | |
| 2012/0323743 A1 | 12/2012 | Chang et al. | |
| 2013/0124996 A1* | 5/2013 | Margulis | G06F 3/0484 |
| | | | 715/719 |
| 2014/0108510 A1 | 4/2014 | Schwesig et al. | |
| 2014/0108931 A1 | 4/2014 | Howard et al. | |
| 2014/0122985 A1 | 5/2014 | Lanahan et al. | |

(56) References Cited

U.S. PATENT DOCUMENTS

| | | | |
|---|---|---|---|
| 2015/0074502 | A1 | 3/2015 | Lanahan et al. |
| 2015/0254212 | A1 | 9/2015 | Lanahan et al. |
| 2016/0170568 | A1 | 6/2016 | Kontkanen et al. |
| 2016/0371266 | A1 | 12/2016 | Howard et al. |
| 2017/0235450 | A1 | 8/2017 | Lanahan et al. |
| 2017/0235712 | A1 | 8/2017 | Lanahan et al. |
| 2018/0329870 | A1 | 11/2018 | Lanahan et al. |
| 2019/0339830 | A1 | 11/2019 | Lanahan et al. |
| 2020/0272787 | A1 | 8/2020 | Lanahan et al. |
| 2021/0081595 | A1 | 3/2021 | Lanahan et al. |

FOREIGN PATENT DOCUMENTS

| | | |
|---|---|---|
| WO | 2000/056055 | 9/2000 |
| WO | 2002/059799 A1 | 8/2002 |
| WO | 2010/003111 A1 | 1/2010 |
| WO | 2010/003121 A1 | 1/2010 |

OTHER PUBLICATIONS

European Summons in Application 09774560.8, mailed May 3, 2017, 16 pages.
"Free Word 2003 Tutorial at GCFLearnFree", Jan. 1, 2003, http://www.gcfleamfree.org/word2003/insterting-hyperlinnks/1, 2 pages.
Taylor, "Crystal Reports 10: Adding a Hyperlink to a Report" In Crystal reports 10 for Dummies, Jun. 1, 2004, 6 pages.
U.S. Appl. No. 14/144,199, Amendment and Response filed Aug. 4, 2017, 11 pages.
U.S. Appl. No. 14/722,030, Office Action dated Jun. 19, 2017, 11 pages.
U.S. Appl. No. 15/250,763, Amendment and Response filed Aug. 7, 2017, 11 pages.
U.S. Appl. No. 12/347,747, Advisory Action dated May 24, 2017, 3 pages.
U.S. Appl. No. 14/722,030, Amendment and Response filed Sep. 19, 2017, 18 pages.
U.S. Appl. No. 14/722,030, Notice of Allowance dated Oct. 19, 2017, 9 pages.
U.S. Appl. No. 15/250,763, Office Action dated Aug. 31, 2017, 14 pages.
Retrieved from the Internet URL: <https://web.archive.org/web/20090731120449/http://blog.justswell.org/drag-and-drop-files-from-your-desktop-to-your-browser-using-javascript/>, Jul. 28, 2009, 5 pages.
U.S. Appl. No. 14/144,199, Notice of Allowance dated Nov. 17, 2017, 8 pages.
U.S. Appl. No. 15/250,763, Amendment and Response filed Nov. 30, 2017, 9 pages.
U.S. Appl. No. 12/347,747, Office Action dated Dec. 29, 2017, 17 pages.
Dorothy Burke, "How to use Lotus Notes 6", Mar. 4, 2003, 4 pages.
EBay the Chatter Check out the eBay to Go Widget, May 17, 2007, 3 pages.
Formatting Shapes and Objects, www.functionx.com/powerpoint/Lesson11.htm, Dec. 14, 2007, 8 pages.
Google Operating System, Upload Files in a Browser Using Drag and Drop, http://googlesystems.blogspot.com/2007/02/upload-files-in-browser-using-drag-and.html, Feb. 23, 2007, 1 page.
Josh Lowensohn, CNET eBay does MySpace-compatible widgets, May 1, 2007, 3 pages.
Michael Arrington, eBay Launches "togo" Widgets for any listing, Apr. 30, 2007, 2 pages.
Microsoft FrontPage 2003 Image Maps: Creating Hotspots, Sep. 29, 2004, 5 pages.
Naj My Depictions Ebay to Go—New Widget to Display Listing, May 22, 2007, 3 pages.
PCT International Preliminary Report on Patentability in PCT/US2009/049606, dated Jan. 5, 2011, 5 pages.
PCT International Preliminary Report on Patentability in PCT/US2009/49622, dated Jan. 5, 2011, 5 pages.
PCT International Search Report and Written Opinion in PCT/US2009/049606, dated Aug. 14, 2009, 6 pages.
PCT International Search Report and Written Opinion in PCT/US2009/49622, dated Aug. 14, 2009, 6 pages.
Shelly Brisbin, "Clickable Image Maps in Adobe GoLive", Mar. 30, 2001, 3 pages.
U.S. Appl. No. 12/347,638, Advisory Action dated Dec. 7, 2016, 3 pages.
U.S. Appl. No. 12/347,638, Amendment and Response filed Dec. 5, 2011, 10 pages.
U.S. Appl. No. 12/347,638, Amendment and Response filed Jul. 11, 2012, 11 pages.
U.S. Appl. No. 12/347,638, Amendment and Response filed Jan. 24, 2013, 11 pages.
U.S. Appl. No. 12/347,638, Amendment and Response filed Aug. 20, 2103, 11 pages.
U.S. Appl. No. 12/347,638, Amendment and Response filed Jan. 3, 2014, 12 pages.
U.S. Appl. No. 12/347,638, Amendment and Response filed Jul. 25, 2014, 14 pages.
U.S. Appl. No. 12/347,638, Amendment and Response filed Apr. 29, 2015, 12 pages.
U.S. Appl. No. 12/347,638, Amendment and Response filed Nov. 17, 2015, 11 pages.
U.S. Appl. No. 12/347,638, Amendment and Response filed Jun. 21, 2016, 11 pages.
U.S. Appl. No. 12/347,638, Amendment and Response filed Nov. 28, 2016, 13 pages.
U.S. Appl. No. 12/347,638, Notice of Allowance dated Dec. 30, 2016, 5 pages.
U.S. Appl. No. 12/347,638, Office Action dated Sep. 8, 2011, 10 pages.
U.S. Appl. No. 12/347,638, Office Action dated Apr. 19, 2012, 11 pages.
U.S. Appl. No. 12/347,638, Office Action dated Oct. 26, 2010, 12 pages.
U.S. Appl. No. 12/347,638, Office Action dated May 21, 2013, 11 pages.
U.S. Appl. No. 12/347,638, Office Action dated Oct. 4, 2013, 12 pages.
U.S. Appl. No. 12/347,638, Office Action dated Apr. 25, 2014, 12 pages.
U.S. Appl. No. 12/347,638, Office Action dated Feb. 10, 2015, 15 pages.
U.S. Appl. No. 12/347,638, Office Action dated Aug. 17, 2015, 15 pages.
U.S. Appl. No. 12/347,638, Office Action dated Jan. 15, 2016, 16 pages.
U.S. Appl. No. 12/347,638, Office Action dated Sep. 26, 2016, 15 pages.
U.S. Appl. No. 12/347,747, Amendment and Response filed Apr. 20, 2011, 11 pages.
U.S. Appl. No. 12/347,747, Amendment and Response filed Oct. 5, 2011, 16 pages.
U.S. Appl. No. 12/347,747, Amendment and Response filed Apr. 23, 2012, 11 pages.
U.S. Appl. No. 12/347,747, Amendment and Response filed Oct. 8, 2014, 13 pages.
U.S. Appl. No. 12/347,747, Amendment and Response filed May 4, 2015, 15 pages.
U.S. Appl. No. 12/347,747, Amendment and Response filed Feb. 18, 2016, 14 pages.
U.S. Appl. No. 12/347,747, Amendment and Response filed Jun. 30, 2016, 13 pages.
U.S. Appl. No. 12/347,747, Amendment and Response filed Dec. 2, 2016, 10 pages.
U.S. Appl. No. 12/347,747, Amendment and Response filed May 10, 2017, 11 pages.
U.S. Appl. No. 12/347,747, Office Action dated Jan. 24, 2011, 9 pages.

(56) References Cited

OTHER PUBLICATIONS

U.S. Appl. No. 12/347,747, Office Action dated Jul. 7, 2011, 8 pages.
U.S. Appl. No. 12/347,747, Office Action dated Jan. 25, 2012, 14 pages.
U.S. Appl. No. 12/347,747, Office Action dated Jul. 8, 2014, 9 pages.
U.S. Appl. No. 12/347,747, Office Action dated Feb. 2, 2015, 10 pages.
U.S. Appl. No. 12/347,747, Office Action dated Nov. 18, 2015, 11 pages.
U.S. Appl. No. 12/347,747, Office Action dated Mar. 31, 2016, 13 pages.
U.S. Appl. No. 12/347,747, Office Action dated Sep. 2, 2016, 15 pages.
U.S. Appl. No. 12/347,747, Office Action dated Mar. 10, 2017, 14 pages.
U.S. Appl. No. 12/347,749, Amendment and Response filed Jun. 22, 2011, 9 pages.
U.S. Appl. No. 12/347,749, Amendment and Response filed Dec. 2, 2011, 9 pages.
U.S. Appl. No. 12/347,749, Amendment and Response filed Mar. 23, 2012, 10 pages.
U.S. Appl. No. 12/347,749, Amendment and Response filed Oct. 4, 2012, 13 pages.
U.S. Appl. No. 12/347,749, Amendment and Response filed May 7, 2013, 13 pages.
U.S. Appl. No. 12/347,749, Notice of Allowance dated Aug. 28, 2013, 11 pages.
U.S. Appl. No. 12/347,749, Office Action dated Mar. 24, 2011, 8 pages.
U.S. Appl. No. 12/347,749, Office Action dated Sep. 2, 2011, 7 pages.
U.S. Appl. No. 12/347,749, Office Action dated Dec. 23, 2011, 9 pages.
U.S. Appl. No. 12/347,749, Office Action dated Jul. 17, 2012, 10 pages.
U.S. Appl. No. 12/347,749, Office Action dated Feb. 13, 2013, 13 pages.
U.S. Appl. No. 12/347,829, Amendment and Response filed Dec. 29, 2011, 13 pages.
U.S. Appl. No. 12/347,829, Amendment and Response filed Sep. 12, 2012, 13 pages.
U.S. Appl. No. 12/347,829, Notice of Allowance dated Sep. 27, 2012, 8 pages.
U.S. Appl. No. 12/347,829, Office Action dated Oct. 5, 2011, 12 pages.
U.S. Appl. No. 12/347,829, Office Action dated Jun. 14, 2012, 12 pages.
U.S. Appl. No. 12/495,438, Amendment and Response filed Sep. 20, 2011, 11 pages.
U.S. Appl. No. 12/495,438, Amendment and Response filed Feb. 10, 2012, 12 pages.
U.S. Appl. No. 12/495,438, Amendment and Response filed Sep. 21, 2012, 12 pages.
U.S. Appl. No. 12/495,438, Amendment and Response filed Apr. 3, 2013, 12 pages.
U.S. Appl. No. 12/495,438, Notice of Allowance dated Jun. 11, 2013, 16 pages.
U.S. Appl. No. 12/495,438, Office Action dated Jun. 20, 2011, 15 pages.
U.S. Appl. No. 12/495,438, Office Action dated Nov. 21, 2011, 15 pages.
U.S. Appl. No. 12/495,438, Office Action dated Jun. 21, 2012, 13 pages.
U.S. Appl. No. 12/495,438, Office Action dated Jan. 3, 2013, 15 pages.
U.S. Appl. No. 12/495,493, Amendment and Response filed Nov. 1, 2011, 11 pages.
U.S. Appl. No. 12/495,493, Amendment and Response filed Mar. 23, 2011, 10 pages.
U.S. Appl. No. 12/495,493, Notice of Allowance dated Aug. 26, 2013, 12 pages.
U.S. Appl. No. 12/495,493, Office Action dated Aug. 2, 2011, 18 pages.
U.S. Appl. No. 12/495,493, Office Action dated Dec. 28, 2011, 18 pages.
U.S. Appl. No. 12/495,520, Amendment and Response filed Jun. 1, 2011, 9 pages.
U.S. Appl. No. 12/495,520, Amendment and Response filed Jan. 11, 2012, 12 pages.
U.S. Appl. No. 12/495,520, Amendment and Response filed Jan. 22, 2013, 12 pages.
U.S. Appl. No. 12/495,520, Amendment and Response filed Jul. 1, 2013, 13 pages.
U.S. Appl. No. 12/495,520, Amendment and Response filed Oct. 22, 2013, 14 pages.
U.S. Appl. No. 12/495,520, Amendment and Response filed Apr. 16, 2014, 18 pages.
U.S. Appl. No. 12/495,520, Amendment and Response filed Jul. 22, 2014, 18 pages.
U.S. Appl. No. 12/495,520, Amendment and Response filed Dec. 16, 2014, 15 pages.
U.S. Appl. No. 12/495,520, Amendment and Response filed Dec. 10, 2015, 20 pages.
U.S. Appl. No. 12/495,520, Notice of Allowance dated Apr. 25, 2016, 8 pages.
U.S. Appl. No. 12/495,520, Office Action dated Mar. 3, 2011, 22 pages.
U.S. Appl. No. 12/495,520, Office Action dated Oct. 18, 2011, 29 pages.
U.S. Appl. No. 12/495,520, Office Action dated Oct. 24, 2012, 31 pages.
U.S. Appl. No. 12/495,520, Office Action dated Apr. 2, 2013, 33 pages.
U.S. Appl. No. 12/495,520, Office Action dated Jul. 22, 2013, 34 pages.
U.S. Appl. No. 12/495,520, Office Action dated Jan. 16, 2014, 34 pages.
U.S. Appl. No. 12/495,520, Office Action dated Apr. 22, 2014, 35 pages.
U.S. Appl. No. 12/495,520, Office Action dated Sep. 16, 2014, 34 pages.
U.S. Appl. No. 12/495,520, Office Action dated Sep. 10, 2015, 39 pages.
U.S. Appl. No. 12/495,684, Amendment and Response filed Feb. 8, 2012, 11 pages.
U.S. Appl. No. 12/495,684, Amendment and Response filed Jul. 6, 2012, 10 pages.
U.S. Appl. No. 12/495,684, Amendment and Response filed Feb. 28, 2014, 11 pages.
U.S. Appl. No. 12/495,684, Notice of Allowance dated Jul. 7, 2014, 15 pages.
U.S. Appl. No. 12/495,684, Office Action dated Nov. 15, 2011, 12 pages.
U.S. Appl. No. 12/495,684, Office Action dated Apr. 10, 2012, 16 pages.
U.S. Appl. No. 12/495,684, Office Action dated Dec. 2, 2013, 14 pages.
U.S. Appl. No. 12/495,718, Amendment and Response filed Feb. 10, 2012, 13 pages.
U.S. Appl. No. 12/495,718, Amendment and Response filed May 22, 2012, 12 pages.
U.S. Appl. No. 12/495,718, Amendment and Response filed Sep. 24, 2013, 12 pages.
U.S. Appl. No. 12/495,718, Amendment and Response filed Mar. 31, 2014, 12 pages.
U.S. Appl. No. 12/495,718, Amendment and Response filed Dec. 30, 2014, 15 pages.
U.S. Appl. No. 12/495,718, Notice of Allowance dated Jan. 26, 2015, 12 pages.

(56) References Cited

OTHER PUBLICATIONS

U.S. Appl. No. 12/495,718, Office Action dated Nov. 15, 2011, 10 pages.
U.S. Appl. No. 12/495,718, Office Action dated Feb. 27, 2012, 11 pages.
U.S. Appl. No. 12/495,718, Office Action dated Jun. 28, 2013, 10 pages.
U.S. Appl. No. 12/495,718, Office Action dated Dec. 30, 2013, 11 pages.
U.S. Appl. No. 12/495,718, Office Action dated Sep. 30, 2014, 10 pages.
U.S. Appl. No. 12/495,748, Amendment and Response filed Feb. 7, 2012, 13 pages.
U.S. Appl. No. 12/495,748, Amendment and Response filed Jul. 11, 2012, 12 pages.
U.S. Appl. No. 12/495,748, Notice of Allowance dated Jul. 18, 2012, 6 pages.
U.S. Appl. No. 12/495,748, Office Action dated Nov. 8, 2011, 8 pages.
U.S. Appl. No. 12/495,748, Office Action dated Apr. 17, 2012, 5 pages.
U.S. Appl. No. 12/495,756, Amendment and Response filed May 2, 2011, 12 pages.
U.S. Appl. No. 12/495,756, Notice of Allowance dated Jun. 15, 2011, 9 pages.
U.S. Appl. No. 12/495,756, Office Action dated Feb. 2, 2011, 15 pages.
U.S. Appl. No. 14/149,140, Amendment and Response filed Jun. 24, 2016, 13 pages.
U.S. Appl. No. 14/149,140, Notice of Allowance dated Nov. 18, 2016, 8 pages.
U.S. Appl. No. 14/149,140, Office Action dated Mar. 24, 2016, 18 pages.
U.S. Appl. No. 14/149,140, Office Action dated Oct. 20, 2016, 13 pages.
U.S. Appl. No. 14/547,083, 312 Amendment filed Apr. 12, 2017, 3 pages.
U.S. Appl. No. 14/547,083, Amendment and Response filed Jul. 20, 2016, 11 pages.
U.S. Appl. No. 14/547,083, Amendment and Response filed Dec. 22, 2016, 12 pages.
U.S. Appl. No. 14/547,083, Notice of Allowance dated Jan. 13, 2017, 9 pages.
U.S. Appl. No. 14/547,083, Office Action dated Apr. 20, 2016, 11 pages.
U.S. Appl. No. 14/547,083, Office Action dated Nov. 3, 2016, 13 pages.
U.S. Appl. No. 14/547,083, Response to 312 Amendment dated Apr. 27, 2017, 2 pages.
U.S. Appl. No. 15/250,763, Amendment and Response filed Apr. 13, 2017, 11 pages.
U.S. Appl. No. 15/250,763, Office Action dated Jan. 13, 2017, 16 pages.
U.S. Appl. No. 15/250,763, Office Action dated May 5, 2017, 13 pages.
Warner, "Dreamweaver CS3 for Dummies" May 7, 2007, 12 pages.
Asterpix—SearchLight: Content Discovery Made Easy, http://www.asterpix.com/searchlightl, Feb. 14, 2011, 1 page.
EHow How to Create a clickable image map with Dreamweaver, Feb. 16, 2008, 2 pages.
Golden Nugget Screenshots, media.psx.ign.com/media/000/000295/imgs_1.html, Apr. 4, 2011, 2 pages.
Golden Nugget, www.absolute-playstation.com/api_review/rgnugg.htm, Apr. 4, 2011, 5 pages.
Guns Hansen's Exclusive Poker Tips Video #1, www.dailymotion.com/video/x3op2y_gus-hansens-exclusive-poker-tips-vi_videogames, Dec. 6, 2007, 2 pages.
Looks Good Works Well by Bill Scotts, Musings on Rich Web Design and User Interface Engineering, http://looksgoodworkswell.golgspot.com/2006/03/maind-hacking-visual-transi_11437691330, Apr. 4, 2011, 7 pages.
U.S. Appl. No. 14/144,199, Advisory Action dated Dec. 30, 2016, 5 pages.
U.S. Appl. No. 14/144,199, Amendment and Response filed Jun. 10, 2016, 12 pages.
U.S. Appl. No. 14/144,199, Amendment and Response filed Nov. 16, 2016, 9 pages.
U.S. Appl. No. 14/144,199, Amendment and Response filed Jan. 17, 2017, 13 pages.
U.S. Appl. No. 14/144,199, Office Action dated Mar. 10, 2016, 44 pages.
U.S. Appl. No. 14/144,199, Office Action dated Sep. 22, 2016, 14 pages.
U.S. Appl. No. 14/144,199, Office Action dated Apr. 4, 2017, 14 pages.
Using Adobe Acrobat, Apr. 9, 2004, 17 pages.
Wikipedia, "File Manager", https://en.wikipedia.org/wiki/File_manager, 7 pages.
World Poker Tour Deals Twelve Million Hands of WPT Texas Hold'Em and Receives Industry Accolades, Feb. 26, 2008, 4 pages, wireless.ign.com/articles/854/854954pl.htm.
WPT Mobile; World Poker Tour; wptmobile.handson.com/wpt_texas_hold_em_2.pho?performcheck=2, 2008, 1 page.
Communication Pursuant to Article 94(3) EPC received for European Patent Application No. 09774560.8, dated Nov. 10, 2014, 7 pages.
Extended European Search report received for European Patent Application No. 09774560.8, dated Jun. 26, 2013, 6 pages.
Response to Communication Pursuant to Article 94(3) EPC filed on Mar. 20, 2015, for European Patent Application No. 09774560.8, dated Nov. 10, 2014, 2 pages.
Response to Extended European Search report filed on Jan. 9, 2014, for European Patent Application No. 09774560.8, dated Jun. 26, 2013, 12 pages.
Applicant Initiated Interview Summary Received for U.S. Appl. No. 14/144,199 dated Apr. 4, 2018, 3 pages.
Non-Final Office Action received for U.S. Appl. No. 14/144,199, dated Mar. 14, 2018, 8 pages.
Response to Non-Final Office Action filed on Apr. 5, 2018, for U.S. Appl. No. 14/144,199, dated Mar. 14, 2018, 20 Pages.
Notice of Allowance received for U.S. Appl. No. 14/722,030, dated Feb. 27, 2018, 7 pages.
Response to Notice of Allowance filed on Jan. 19, 2018 for U.S. Appl. No. 14/722,030, dated Oct. 19, 2017, 7 pages.
Applicant Initiated Interview Summary Received for U.S. Appl. No. 15/250,763 dated Apr. 16, 2018, 3 pages.
Applicant Initiated Interview Summary received for U.S. Appl. No. 15/250,763 dated Dec. 4, 2017, 3 pages.
Final Office Action received for U.S. Appl. No. 15/250,763, dated Mar. 27, 2018, 12 pages.
Preliminary Amendment filed for U.S. Appl. No. 15/584,993, dated May 2, 2017, 7 pages.
Applicant Initiated Interview Summary received for U.S. Appl. No. 12/347,747 dated Apr. 3, 2018, 3 pages.
Response to Non-Final Office Action filed on Mar. 28, 2018, for U.S. Appl. No. 12/347,747, dated Dec. 29, 2017, 17 pages.
Extended European Search report received for European Patent Application No. 09774570.7, dated Nov. 22, 2011, 8 pages.
Summons to Attend Oral Proceedings received for European Patent Application No. 09774570.7, mailed on Oct. 14, 2015, 7 pages.
Response to Communication pursuant to Rules 94(3) EPC filed on Jan. 27, 2014, for European Patent Application No. 09774570.7, dated Sep. 16, 2013, 10 pages.
Communication Pursuant to Article 94(3) EPC received for European Patent Application No. 09774570.7, dated Sep. 16, 2013, 5 pages.
Examiner Initiated Interview Summary received for U.S. Appl. No. 14/144,199, dated Aug. 7, 2018, 1 page.
Notice of Allowance received for U.S. Appl. No. 14/144,199, dated Aug. 7, 2018, 8 pages.

(56) References Cited

OTHER PUBLICATIONS

Notice of Allowance received for U.S. Appl. No. 14/722,030, dated Jun. 11, 2018, 7 pages.
Advisory Action received for U.S. Appl. No. 15/250,763, dated Jul. 5, 2018, 3 pages.
Response to Final Office Action filed on May 29, 2018, for U.S. Appl. No. 15/250,763, dated Mar. 27, 2018, 18 pages.
Corrected Notice of Allowability received for U.S. Appl. No. 14/144,199, dated Sep. 14, 2018, 3 pages.
Applicant-Initiated Interview Summary received for U.S. Appl. No. 15/250,763, dateed Oct. 2, 2018, 4 pages.
Non-Final Office Action received for U.S. Appl. No. 15/250,763, dated Sep. 20, 2018, 12 pages.
Preliminary Amendment filed for U.S. Appl. No. 15/250,763, dated Sep. 6, 2016, 8 pages.
Final Office Action received for U.S. Appl. No. 12/347,747, dated Jul. 12, 2018, 11 pages.
Response to Non-Final Office Action filed on Dec. 21, 2018, for U.S. Appl. No. 15/250,763 , dated Sep. 20, 2018, 21 pages.
Corrected Notice of Allowability Received for U.S. Appl. No. 14/144,199 dated Nov. 2, 2018, 3 pages.
Corrected Notice of Allowability received for U.S. Appl. No. 14/144,199, dated Nov. 19, 2018, 3 pages.
Notice of Allowance received for U.S. Appl. No. 14/722,030, dated Jan. 23, 2019, 7 pages.
Roxio, "Photoshow", Retrieved from the Internet URL: <http://www.photoshow.com/home/start>, Accessed on May 21, 2019, 1 page.
Final Office Action received for U.S. Appl. No. 15/250,763 , dated Apr. 12, 2019, 13 pages.
Non Final Office Action Received for U.S. Appl. No. 16/046,547, dated Mar. 20, 2020, 9 pages.
Applicant Initiated Interview Summary Received for U.S. Appl. No. 16/046,547, dated Jun. 5, 2020, 3 Pages.
Notice of Allowance received for U.S. Appl. No. 16/046,5476, dated Jul. 16, 2020, 7 pages.
Response to Non-Final Office Action Filed on Jun. 19, 2020, for U.S. Appl. No. 16/046,547, dated Mar. 20, 2020, 17 pages.
Catone,"Create Photo Books with Panraven", readwrite.com, retrieved from https://readwrite.com/2007/07/30/create_photobooks_with_panraven/.Jul. 30, 2007, 3 Pages.
Applicant Initiated Interview Summary received for U.S. Appl. No. 12/347,638, dated Apr. 12, 2016, 3 pages.
Applicant Initiated Interview Summary Received for U.S. Appl. No. 12/347,747, dated Dec. 20, 2019, 3 pages.
Applicant Initiated Interview Summary received for U.S. Appl. No. 12/347,747, dated Nov. 8, 2016, 3 pages.
Decision on Pre Appeal Brief received for U.S. Appl. No. 12/347,747, dated Nov. 27, 2018, 2 pages.
Final Office Action Received for U.S. Appl. No. 12/347,747, dated Mar. 31, 2020, 12 pages.
Non Final Office Action Received for U.S. Appl. No. 12/347,747, dated Jul. 24, 2020, 15 Pages.
Non-Final Office Action Received for U.S. Appl. No. 12/347,747, dated Oct. 4, 2019, 14 pages.
Pre Appeal Brief Filed on Oct. 12, 2018, for U.S. Appl. No. 12/347,747, 5 pages.
Response to Final Office Action filed on Jun. 30, 2020 for U.S. Appl. No. 12/347,747, dated Mar. 31, 2020, 13 pages.
Response to Final Office Action filed on Mar. 25, 2019, for U.S. Appl. No. 12/347,747, dated Jul. 12, 2018, 10 pages.
Response to Non-Final Office Action filed on Dec. 27, 2019 for U.S. Appl. No. 12/347,747, dated Oct. 4, 2019, 11 pages.
Response to Non-Final Office Action filed on Nov. 24, 2020 for U.S. Appl. No. 12/347,747, dated Jul. 24, 2020, 14 pages.
Applicant-Initiated Interview Summary received for U.S. Appl. No. 12/495,684, dated Feb. 28, 2014, 3 pages.
Applicant Initiated Interview Summary received for U.S. Appl. No. 14/547,083, dated Dec. 16, 2016, 3 pages.
Non-Final Office Action received for U.S. Appl. No. 15/584,993, dated Apr. 19, 2019, 12 pages.
Amendment After Notice of Allowance Under 37 CFR filed on Oct. 16, 2020 U.S. Appl. No. 16/046,547, 4 pages.
PTO Response to rule 312 Communication Received for U.S. Appl. No. 16/046,547, dated Oct. 26, 2020, 2 pages.
Applicant Initiated Interview Summary Received for U.S. Appl. No. 16/511,499, dated Aug. 25, 2020, 3 Pages.
Final Office Action Received for U.S. Appl. No. 16/511,499, dated Dec. 4, 2020, 16 pages.
Non Final Office Action Received for U.S. Appl. No. 16/511,499, dated Jun. 11, 2020, 14 pages.
Response to Non-Final Office Action filed Aug. 24, 2020 for U.S. Appl. No. 16/511,499, dated Jun. 11, 2020, 12 pages.
Burke,"How to Use Lotus Notes 6", Mar. 4, 2003, 4 pages.
Notice of Allowance Received for U.S. Appl. No. 12/347,747, dated Jan. 26, 2021, 9 Pages.
Supplemental Notice of Allowability Received for U.S. Appl. No. 12/347,747, dated Feb. 18, 2021, 3 pages.
Non Final Office Action Received for U.S. Appl. No. 16/511,499, dated Feb. 18, 2021, 14 pages.
Yahoo!,"Groups—Groups Messages Help, Collection of Help pages for Yahoo!", Groups as captured by Internet Archive Wayback Machine in February of 2006, originally available at http://help.yahoo.com/help/us/groups/index.html. (Year: 2006), 2006, 9 Pages.
Supplemental Notice of Allowability Received for U.S. Appl. No. 12/347,747, dated Apr. 27, 2021, 3 pages.
Final Office Action Received for U.S. Appl. No. 16/511,499, dated Jun. 14, 2021, 14 Pages.

* cited by examiner

SYSTEM AND METHODS FOR AUTOMATIC MEDIA POPULATION OF A STYLE PRESENTATION

CROSS-REFERENCE TO RELATED APPLICATIONS

This application is a continuation of U.S. patent application Ser. No. 14/149,140, filed Jan. 7, 2014, now issued as U.S. Pat. No. 9,613,006, entitled "System and Methods For Automatic Media Population of a Style Presentation", which is a continuation of U.S. patent application Ser. No. 12/347,749, filed Dec. 21, 2008, now issued as U.S. Pat. No. 8,627,192, entitled "System and Methods For Automatic Media Population of a Style Presentation", which claims priority and the benefit of U.S. Provisional Patent Application Ser. No. 61/078,288, filed Jul. 3, 2008, entitled, "Multi-Media Online Presentation System and Method," the entire disclosures of which are incorporated herein by reference.

BACKGROUND

Field of Invention

The present invention generally relates to network-based multimedia presentations and more particularly to a system and methods for automatic media population of a style presentation.

Related Art

Multimedia is media and content that utilizes a combination of different content forms. The term is used in contrast to media that only utilizes traditional forms of printed or hand-produced text and still graphics. In general, multimedia includes a combination of text, audio, still images, animation, video, and interactivity content forms. Multimedia is usually recorded and played, displayed, or accessed by information content processing devices, such as computerized and electronic devices. Multimedia finds its application in various areas including, but not limited to, social marketing, advertisement, art, education, entertainment, engineering, medicine, mathematics, business, scientific research and spatial temporal applications.

A variety of online websites are presently available to enable the creation and presentation including the publication of some form of multimedia. For example, MixerCast enables a user to build a social marketing, application from scratch. Scrapblog enables a user to combine photos, videos, audio and text to create multimedia scrapbooks. Smilebox facilitates "creative messaging" that draws elements from photo services, scrapbooking, and e-cards.

Each website will typically provide one or more online tools for the creation and customization of the multimedia. Such online tools and/or desktop tools such as Photoshop, Illustrator, etc., allow the user to collect, edit, create, and publish or distribute the multimedia. In this regard, various style presentations may be utilized, photos may be resized and text may be added, video may be inserted, and/or links to other sites or presentations may be provided. Despite providing some level of customization, multimedia tools currently available are often cumbersome and difficult to use and thus limit the self-expression and creativity of the non-professional user when creating multimedia presentations. Accordingly, there exists a need for a relatively more robust multimedia creation tool including a system and method for the automatic media population of a style presentation.

SUMMARY

For purposes of summarizing the disclosure, exemplary embodiments of systems and methods for automatic media population of a style presentation have been described herein.

In one embodiment, a method for automatic media population of a style presentation, comprises: collecting presentation media; positioning the collected presentation media on a storyboard; and selecting a style presentation; wherein the selection of the style presentation results in the automatic population of the style presentation with the presentation media positioned on the storyboard.

In another embodiment, a system for automatic media population of a style presentation, comprises a storage device; a processing element having a processing program and access to the storage device; and a process-readable medium having executable instructions thereon to direct the processing system when used by the processing element to: collect presentation media; position the collected presentation media on a storyboard; and select a style presentation; wherein the selection of the style presentation results in the automatic population of the style presentation with the presentation media positioned on the storyboard.

In still another embodiment, a computer-readable medium having compute executable instructions for performing a method comprises collecting presentation media; positioning the collected presentation media on a storyboard selecting a style presentation; wherein the selection of the style presentation results in the automatic population of the style presentation with the presentation media positioned on the storyboard.

These and other features and advantages of the present invention will be more readily apparent from the detailed description of the embodiments set forth below taken in conjunction with the accompanying drawings.

Figure 1:
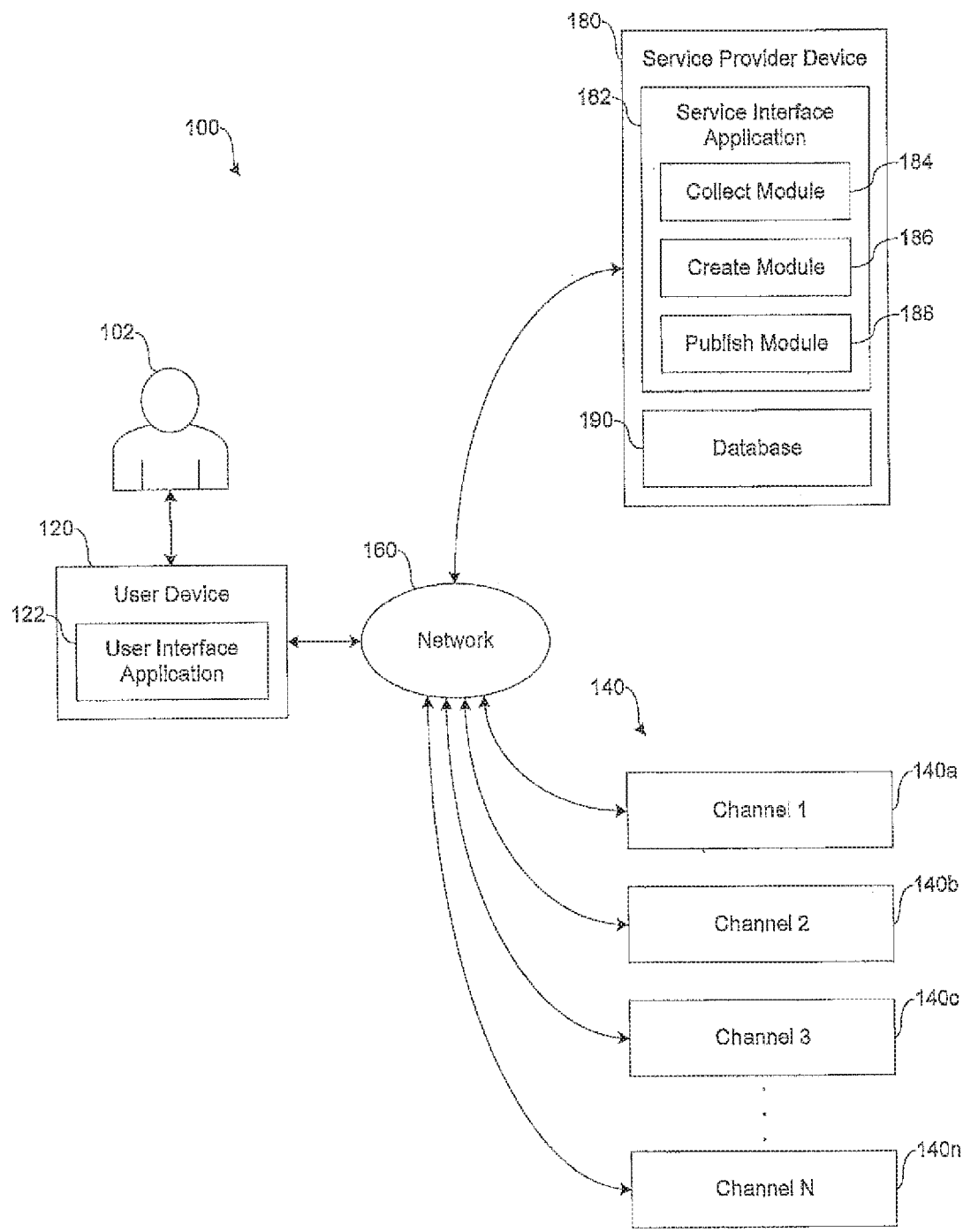
FIG. 1 shows a block diagram of a system configured to facilitate the creation and publishing and/or sharing of media presentations over a network.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure related to systems and methods for the automatic media population of a style presentation. As indicated above, multimedia presentations may find application in various areas including, but not limited to, social marketing, advertisement, art, education, entertainment, engineering, medicine, mathematics, business, scientific research and spatial temporal applications.

In one embodiment a system and method provides for a robust end-to-end digital media creation architecture that enables a user to create rich multi-media presentations and clips online with real-time editing and authoring, and then share or publish the media online. As shown in FIG. 1, the system 100 includes at least one client device 120 (e.g., network computing device), one or more multi-media distribution channels 140 (e.g., network server devices), and at least one service provider device 180 (e.g., network server device) in communication over the network 160.

In one embodiment, the network 160 may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

In various embodiments, the at least one client device 120 may be implemented using any appropriate combination of hardware and/or software configured for wired and/or wireless communication over the network 160. The client device 120 may be implemented as a personal computing device (e.g., a personal computer (PC)) in communication with the network 160, such as the Internet. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or customer device without departing from the scope of the present disclosure.

In one embodiment, the client device 120 includes a user interface application 122 that may be utilized by a user 102 to conduct information transactions with the distribution channels 140 and the service provider server 180 over the network 160. For example, the user interface application 122 may be implemented as a multi-media presentation application to collect, create and publish information via the network 160. In various implementations, multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider server 180 via the network 160. In another implementation, the user interface application 122 comprises a browser module that provides a network interface to browse information available over the network 160. For example, the user interface application 122 may be implemented, in part, as a web browser to view information available over the network 160. In another example, each member of the user group 102 is able to access multi-media websites via the one or more multi-media channels 140 to view, collect and publish multi-media presentations over the network 160.

In various embodiments, the client device 120 may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120 may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider server 180 during publishing and/or sharing of a multi-media presentation.

In one embodiment, the multi-media distribution channels 140 may be maintained by one or more resource providers and/or entities (e.g., social networking sites, resource information sites, management sites, merchant sites, etc.) in communication with the network 160. In this regard, the service provider server 180, discussed below, may maintain or provide access to the one or more of the multi-media distribution channels. The multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

In one embodiment, the service provider server 180 may be maintained by an online transaction processing provider and/or entity in communication with the network 160. As such, the service provider server 180 may be implemented using any appropriate combination of hardware and/or software configured for wired and/or wireless communication over the network 160. In one implementation, the service provider server 180 may be implemented as a network computing device (e.g., a network server) in wired and/or wireless communication with the network 160.

As further shown in FIG. 1, the service provider server 180 includes a service interface application 182, which may be adapted to interact with the client device 120 to facilitate the collection of media, as well as the creation including editing and the publishing and/or sharing of multimedia presentations over a network. In one example, the service provider server 180 may be provided and implemented by PayPal, Inc. of San Jose, Calif., USA.

The service application 182, in one embodiment, utilizes a collect module 184, a create module 186, and a publish module 188 running on a standard web browser to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into another user's webpage. Still other examples include the ability to publish multi-media presentations on a website to sell a particular item or service for purchase. For items and/or services, a media rich presentation may help users market and sell items and/or services, which may be valuable for high-end or high-priced items and/or services. Social and/or dating sites may utilize these multi-media presentations to provide online users with a way to better present themselves to other online users. In various implementations, some type of webpage may be presented in a more dynamic manner by utilizing Rich Site Summary (RSS) feeds, since, for example, a particular user's presentation may be continually changing with new media.

In various embodiments, the service provider server 180 may be configured to maintain, store anchor archive multi-media presentations in a database 190, each of which may include information related to one or more users, such as the user 102, and one or more multimedia channels, such as multimedia distributions channels 140. In various examples, the multimedia presentations may include attributes stored as part thereof, and the attributes may be passed to the service provider server 180 as part of a creating, publishing and/or sharing the multi-media presentations.

Referring to FIG. 1, in one embodiment, the collect module 184 enables the user 102 to collect audio, photographic images, video, and music media from various sources, such as a PC, RSS feeds, websites, and any other online source, via a user interface, such as the user interface application 122. In various implementations, the user interface application 122 comprises multiple tabs and/or links for the various sources. Key words can be selected to search photos in Flickr or videos in YouTube. For example, typing in "flamingo" and selecting Flickr results in pictures of flamingos or photos matching the word "flamingo" from Flickr being presented on the user's GUI or media page. The user can then drag and drop desired pictures onto a storyboard on that same screen. The pictures can be edited into stacks if desired. For videos, a desired video can be placed onto the user's media page by typing in the corresponding URL in YouTube. The system can then display the complete as well as a series of shorter video clips. The whole video or selected shorter clips, as well as the photos can then be dragged and dropped into a storybook section to create a presentation from the media collected.

Once collected, the media may be saved and categorized in the database 190 and edited on the system site via the service provider server 180. Editing may include one or inure of sizing, rotating, overlying, moving and stacking various media backward and forward with an overlay or stack. Video may be broken up automatically by the service provider server 180 into smaller segments. Selected video segments may be combined and/or used as desired. Selected media may be placed on a virtual storyboard, such as a clipboard, on the same screen as the collection of media. Media may be edited either it the collection or in the storyboard. Placing desired media on the storyboard or clip board may be accomplished by dragging and dropping. In one example, the collect module 184 provides selected media on a storyboard. In another example, the collect module 184 provides media on a user's media page (i.e., not placed on the storyboard). In still another example, uploading media may be delayed until editing is completed.

In one embodiment, the create module 186 enables the user 102 to place selected media onto a storyboard. The service provider server 180 may automatically suggest a story idea to launch the creative process, or the user 102 may select a specific style or presentation tool. Within the presentation, there may be multiple styles, such as a picture frame, a television, a billboard, etc. In one implementation, media from the storyboard may be dragged and dropped onto the presentation. In this regard, media may be placed within the viewing window of each type of style.

Alternatively, as shown in FIGS. 2A-2H, the user can create a presentation from the media in the storybook section by selecting a style, such as a slide show, a photo slider, a room with different viewing areas including picture frames, etc. The media is then automatically loaded into the selected style. For example, a clustered set of photos may automatically play in frame, and a video clip may automatically play on a television. In another example, the branches of a tree are automatically filled with different selected media for viewing. Another style may be a page of postcards, such that when that style is selected, the previously chosen media is automatically filled into the postcards on a single page.

Figure 2A:
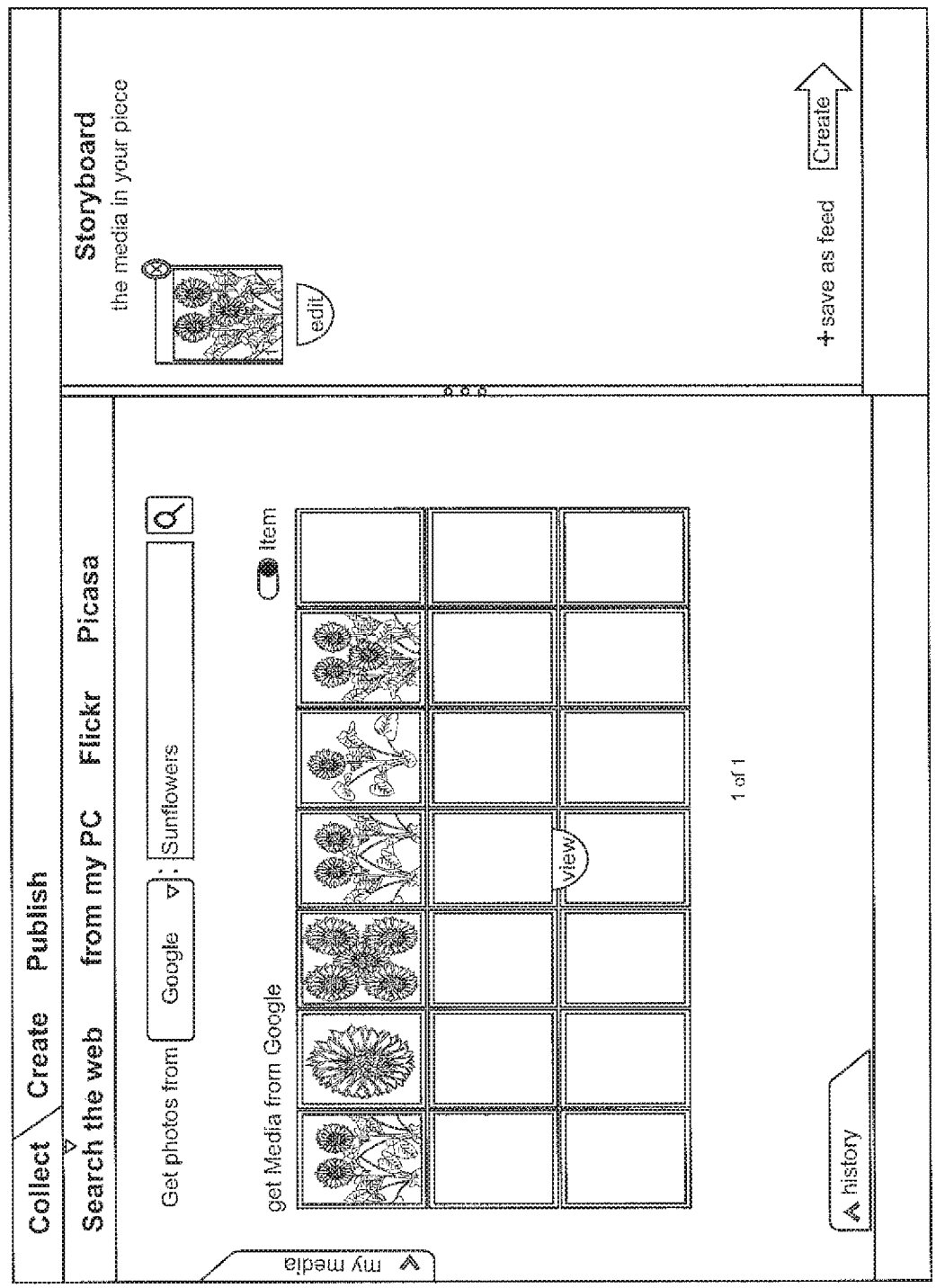
FIGS. 2A-2H show elements, components, or stages for the automatic media population of a style presentation inn accordance with one embodiment.
Figure 2B:
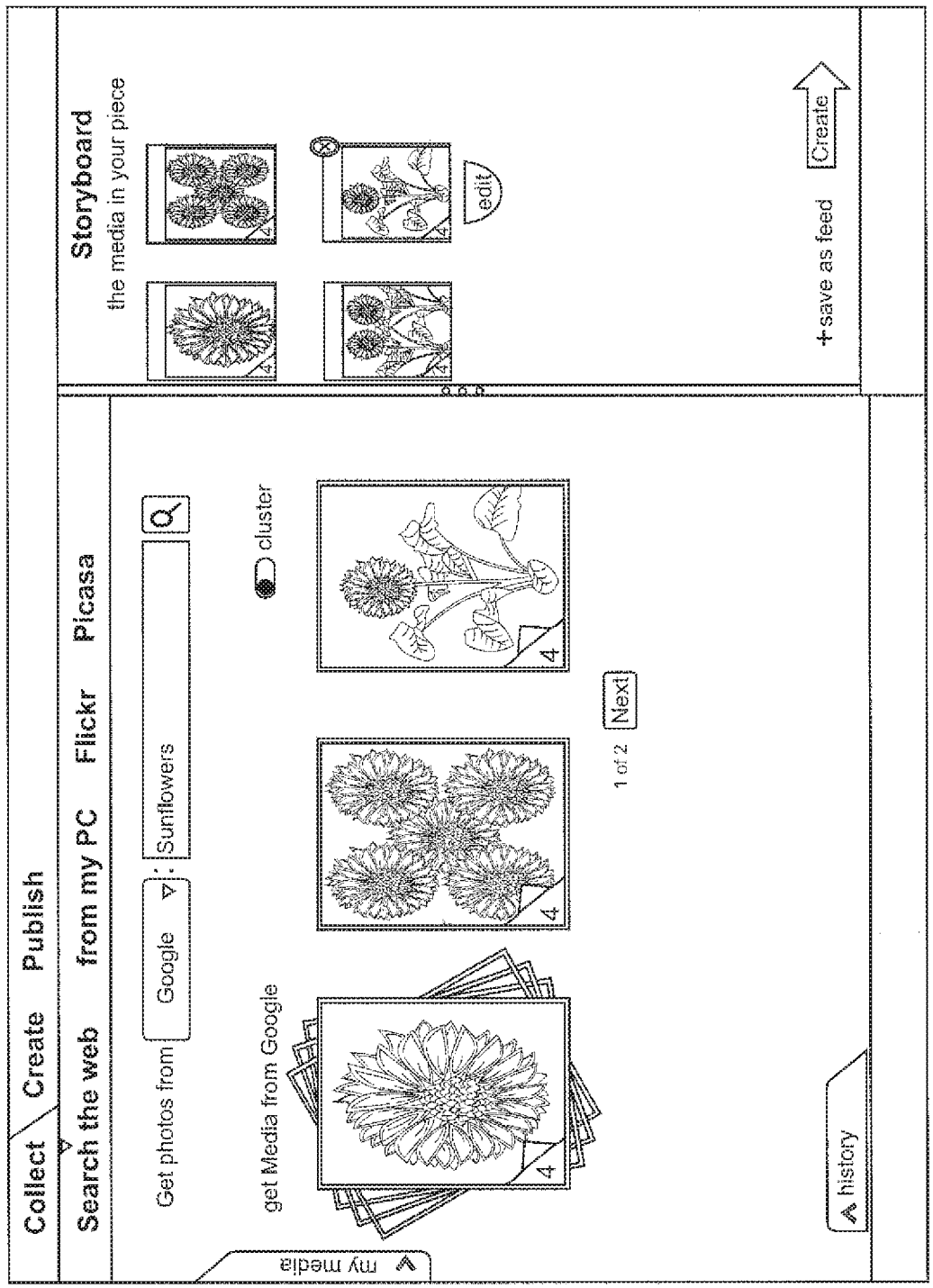
Figure 2C:
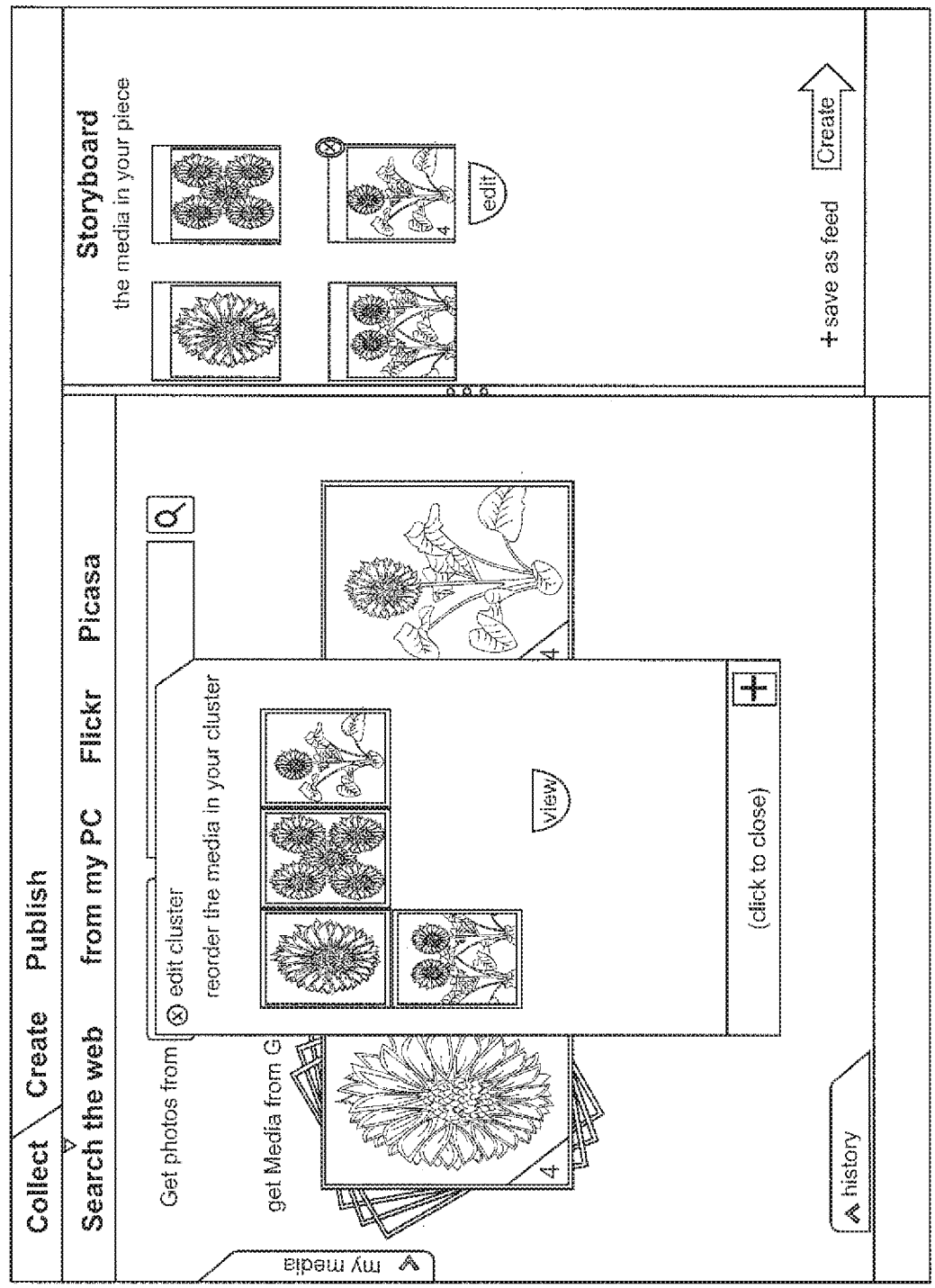
Figure 2D:
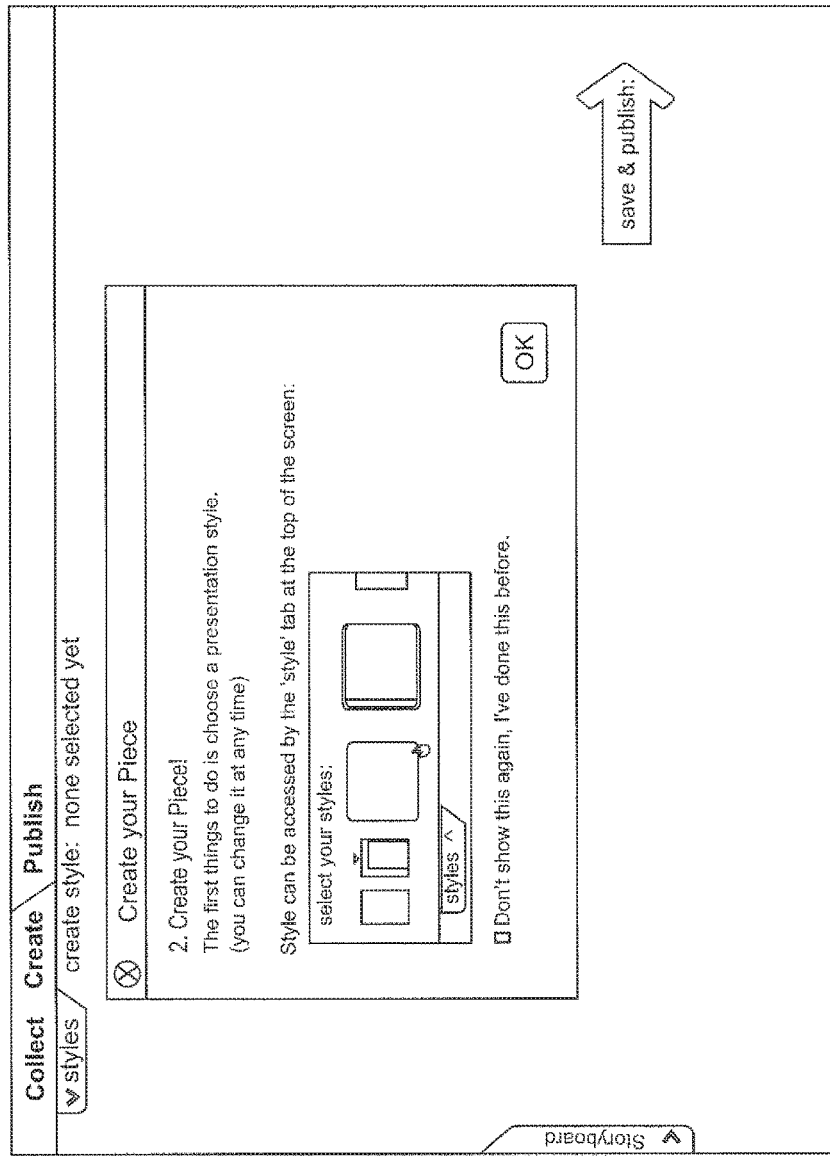

More specifically, in one embodiment, once media is collected, storyboard located on the right side of the user interface may be populated with the collected media by dragging and dropping one or more of the media items or cluster of media items collected from the various media sources from the media, collection area onto the storyboard for later use in creating a media piece (FIG. 2A). In this regard, the storyboard may includes two items collected from the web, one item uploaded from a PC, and a cluster of four items also collected from the web (FIG. 2B). Media positioned on the storyboard may be edited prior to creating a media piece. For example, individual items of media in a media cluster may be reordered (FIG. 2C). Once media has been collected and edited, media piece creation may proceed by clicking the create arrow at the bottom of the user interface and then choosing to proceed to the create module 186 (FIG. 2D).

Figure 2E:
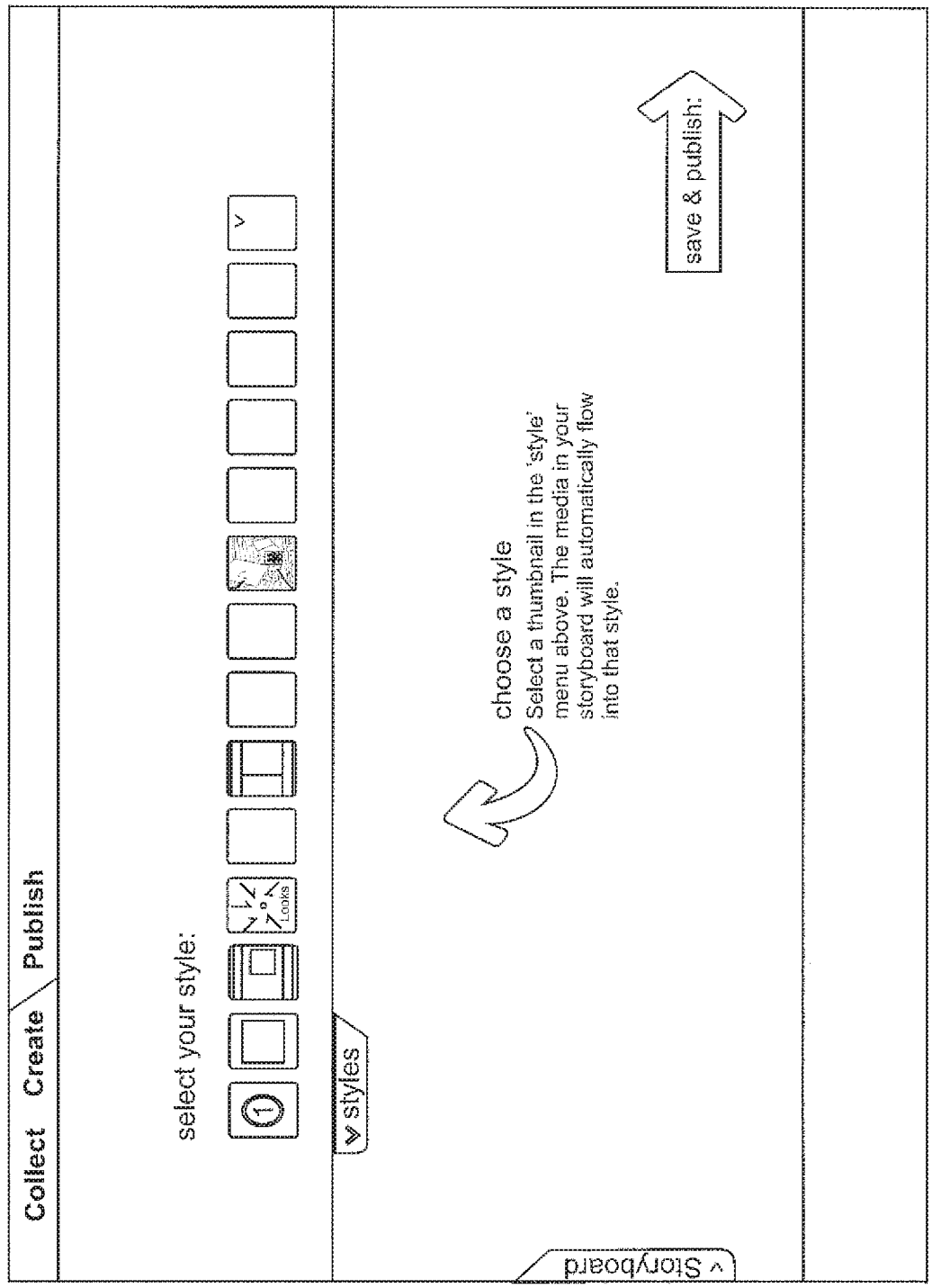
Figure 2F:
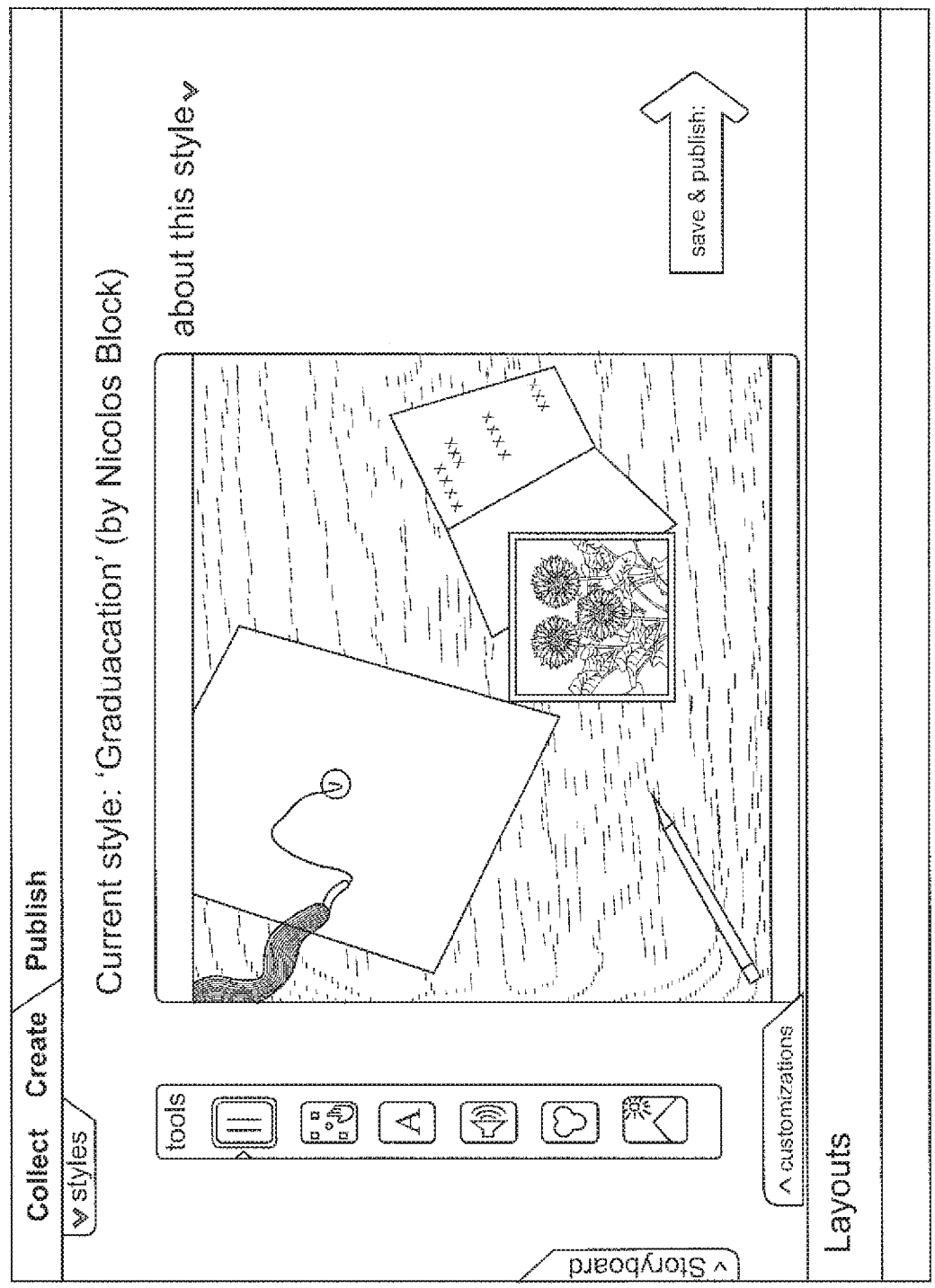
Figure 2G:
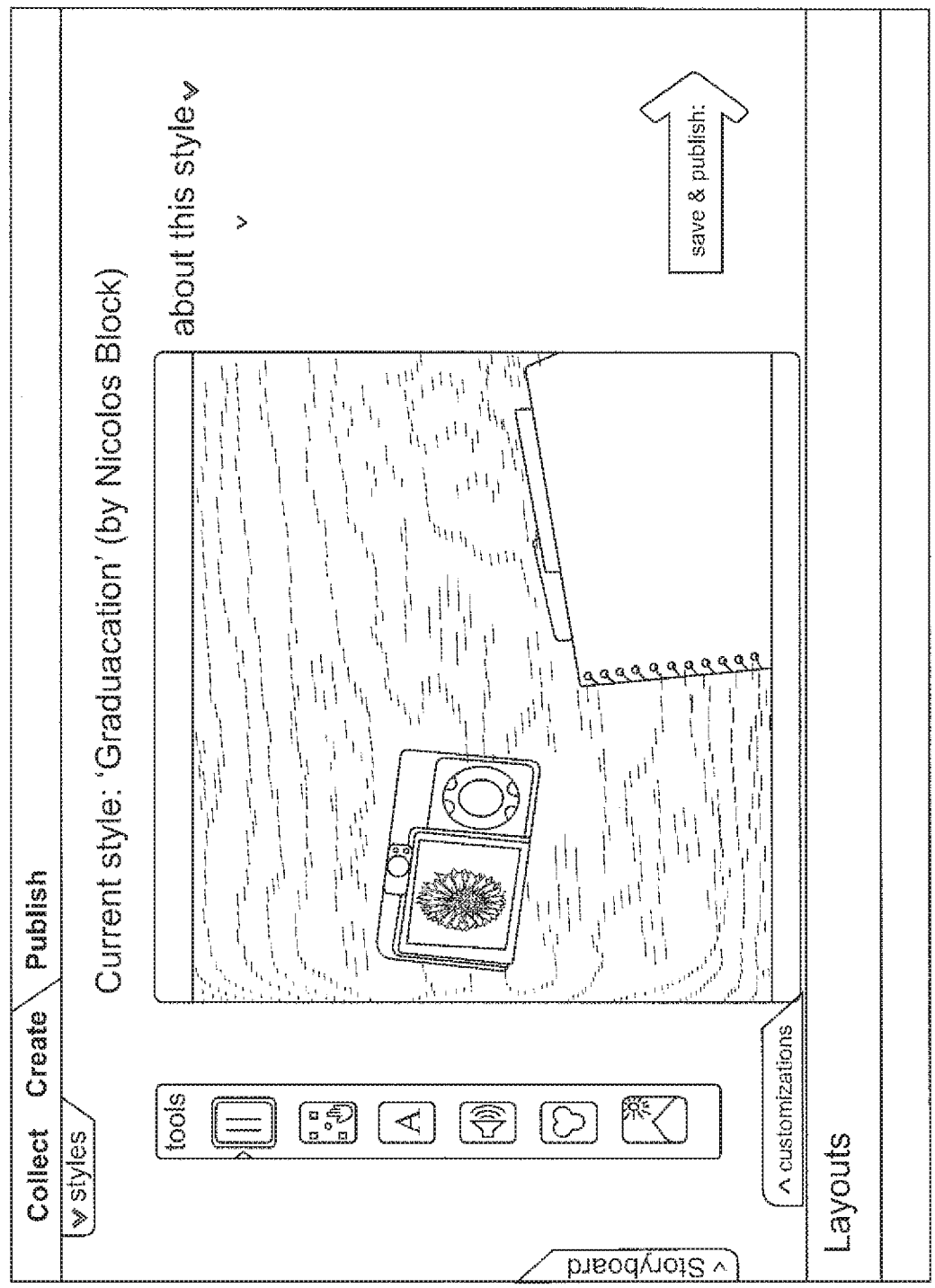
Figure 2H:
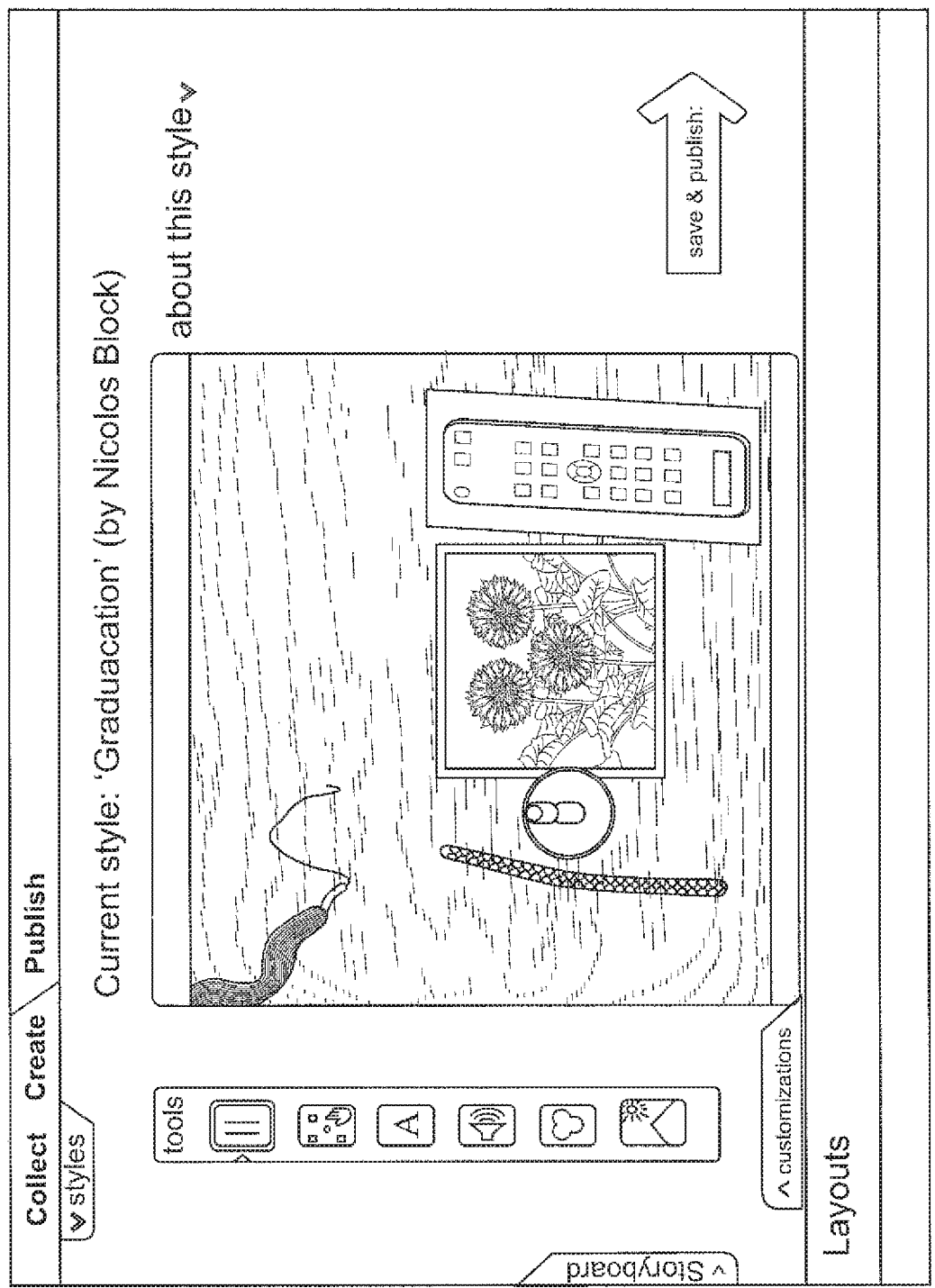

As indicated above, to begin the process of creating media piece the user may select a thumbnail from the presentation "styles" menu (FIG. 2E). Presentation styles may include, but are not limited to, a picture frame, billboard, kaleidoscope, street scene, landscape, etc. Once a "style" is selected media from the storyboard will automatically flow into or populate the chosen "style" (FIGS. 2F, 2G, and 2H). In this regard, the presentation media shown in FIG. 2B has automatically populated corresponding presentation elements with the chosen presentation style. Some styles, which support movement of media as part of a presentation style, may provide the user with the ability to customize various characteristics of the movement such as speed of media rotation, etc., within the style.

Once the style is chosen, the user may also select different variations of the style. Each particular style typically has a different set of variations suited for style. For example, for the tree style, a user array select different types of frames on the branches to contain the media, a specific background may be selected from a user image, and different style trees may be used. For the photo slider, different types and styles of frames may be used, as well as different types or presentations, e.g., spacing between photos, no spacing, and background selection. For the page of postcards, the user may select different configurations of the postcards on the page as well as different backgrounds far the page.

Once in the style presentation, the media may be edited. For example, the media may be rotated, sized, cut-out (e.g., se cling the boundaries of an image, such as with clicks to designate points along the boundary, enabling as coarse or fine a resolution as desired), moved forward or backward in relation to adjacent media, slide multiple images to add or remove spaces within the presentation, and adding a hotspot (e.g., selecting an area of the image for additional information, such as adding a link, video, text, etc.). Other editing features may include adding audio to the background, adding text, and/or distorting images. This further editing may depend or the style chosen, as different styles may have different editing capabilities. In one aspect, the editing may be achieved in real-time so that the user 102 may quickly and easily see the results and change them as needed.

Various tools or modules may be combined, used, and/or modified to provide the user with different initial choices regarding the type of presentation and features desired for creating the multimedia presentation. For example, as described blow, the user may access a collage tool or application to create dynamic interactive panoramas with "hot spots" and layouts of photos, video, text and audio on an infinite stage. In one variation of collage the stage extends infinitely to the right, and when viewed there is a natural progression from left to right that can map well to linear narrative, time, or space. In another variation the stage extends infinity downward. Again, this presents a natural mapping to time, space, or narrative. The collage tool introduces a new creation platform for WYSIWYG online multimedia layout and sharing, offering the ability to include direct links and presentations.

In one embodiment, the publish module 186 enables the user 102 to share, publish and/or distribute the presentation when, for example, the presentation is completed. In one implementation, as described herein, the presentation may be saved in the database 190 of the service provider server 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

The collect, create, and publish modules 184, 186, 188 may be combined, used, and/or modified to provide the user 102 with different initial choices regarding the type of presentation and features desired for creating the multimedia presentation. The choices may be a simple, easy to use tool to quickly build presentations with dynamic content from RSS feeds and online albums. Accordingly, the user 102 may select a presentation style and then link it to the user's media libraries through RSS feeds that maintain an "always on" permalink to the content source.

Figure 3:
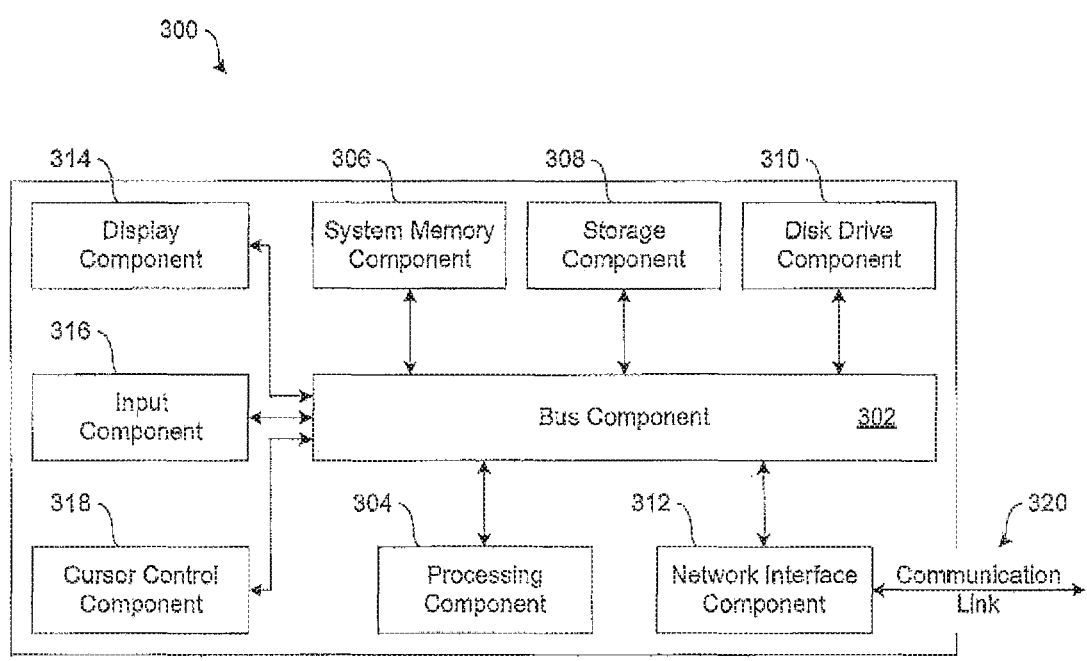
FIG. 3 is a block diagram of a computer system suitable for implementing one or more embodiments of the present disclosure.

FIG. 3 is a block diagram of a computer system 300 suitable for implementing one or more embodiments of the present disclosure, including the user device 120, the one or more distribution channels 140, and the service provider device 180. In various implementations, the client device 140 may comprise a personal computing device capable of communicating with the network 160, such as a personal computer, laptop, cell phone, PDA, etc., the one or more merchant devices 140 may comprise a network computing device, such as a network server, and the service provider device 180 may comprise a network computing device, such as a network server. Hence, it should be appreciated that each of the devices 120, 140, 180 may be implemented as computer system 300 in a manner as follows.

In accordance with various embodiments of the present disclosure, computer system 300, such as a personal computer and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), and cursor control component 318 (e.g., mouse or trackball). In one implementation, disk drive component 310 may comprise a database having one or more disk drive components.

In accordance with embodiments of the present disclosure, methods described herein are developed as a program language and embodied in a processing or computer-readable medium as executable instructions that can be used to direct a processing program when used by the computer system 300. In this regard, the computer system 300 may perform specific operations by processor 304 executing one or more sequences of one or more instructions contained in system memory component 306. Such instructions may be read into system memory component 306 from a computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including hut not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 320 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device, comprising:
   at least one processing unit; and
   a memory coupled to the at least one processing unit and storing instructions that, when executed by the at least one processing unit, perform a method, comprising:
      receiving a selection of at least a first media element and a second media element from a library of media elements displayed on a user interface of the computing device, wherein the first media element is a first type and the second media element is a second type that is different from the first type;
      arranging at least one of the first media element and the second media element on a storyboard on the user interface of the computing device, wherein the storyboard includes one or more tools for altering an appearance of at least one of the first media element and the second media element;
      performing a first alteration of at least one of the first media element and the second media element within the storyboard based on a selection of the one or more tools;
      receiving a selection of a style for the storyboard;
      upon receiving the receiving selection of the style, receiving a selection of a variation of the style from among a plurality of variations of the style;
      in response to receiving the selection of the variation of the style, automatically populating one or more presentation elements associated with the selected variation of the style with at least one of the first media element and the second media element, wherein automatically populating one or more presentation elements comprises performing a second alteration of at least one of the first media element or the second media element based upon the selected style; and
      transmitting the storyboard to a server associated with a social media site to publish the storyboard on the social media site.

2. The computing device of claim 1, further comprising instructions for presenting the first media element and the second media element on the storyboard in a selected style.

3. The computing device of claim 1, wherein the first media element is an image.

4. The computing device of claim 1, wherein the first media element is a video.

5. The computing device of claim 1, wherein the library of media elements is displayed concurrently with the storyboard in the user interface of the computing device.

6. The computing device of claim 1, further comprising instructions for automatically adding an additional media element to the storyboard based on a received input.

7. The computing device of claim 1, further comprising instructions for associating text with at least one of the first media element or the second media element.

8. A method for creating a media presentation, comprising:
   receiving a selection of a first media element and a second media element from a library of media elements, wherein the first media element is a first type and the second media element is a second type that is different from the first type;
   arranging at least one of the first media element and the second media element on a storyboard;
   performing a first alteration of at least the first media element or the second media element within the storyboard based on a selection of one or more editing tools associated with the storyboard;
   receiving a selection of a style for the storyboard;
   upon receiving the receiving selection of the style, receiving a selection of a variation of the style from among a plurality of variations of the style;
   in response to receiving the selection of the variation of the style, automatically populating one or more presentation elements associated with the selected variation of the style with at least one of the first media element and the second media element, wherein automatically populating one or more presentation elements comprises performing a second alteration of at least one of the first media element or the second media element based upon the selected style;

automatically generating the media presentation using the storyboard; and sending the media presentation to a remote computing device for display.

9. The method of claim 8, wherein sending the media presentation to the remote computing device comprises sending the media presentation to a specified individual associated with the remote computing device.

10. The method of claim 8, further comprising specifying an order of the first media element and the second media element in the storyboard based on received input.

11. The method of claim 8, wherein the first media element is an image.

12. The method of claim 8, wherein the first media element is a video.

13. The method of claim 8, wherein the media presentation includes an input mechanism that causes the first media element and the second media element to be displayed in response to received input.

14. The method of claim 8, wherein the library of media elements is accessible over a network.

15. A system, comprising:
at least one processing unit; and
a memory coupled to the at least one processing unit and storing instructions that, when executed by the at least one processing unit, perform a method for automatically generating a media presentation, comprising:
receiving a selection of a first media element and a second media element from a library of media elements, wherein the first media element is a first type and the second media element is a second type that is different from the first type;
arranging, without user input, at least one of the first media element and the second media element in a storyboard of a user interface;
performing a first alteration of at least one of the first media element or the second media element based upon a selection of a an editing tool associated with the storyboard;
receiving a selection of a style for the storyboard;
upon receiving the receiving selection of the style, receiving a selection of a variation of the style from among a plurality of variations of the style;
in response to receiving the selection of the variation of the style, automatically populating one or more presentation elements associated with the selected variation of the style with at least one of the first media element and the second media element, wherein automatically populating one or more presentation elements comprises performing a second alteration of at least one of the first media element or the second media element based upon the selected style;
generating a media presentation using the storyboard; and
sending the media presentation to a remote computing device.

16. The system of claim 15, further comprising instructions for changing an order of at least one of the first media element or the second media element on the storyboard based on the received input.

17. The system of claim 15, wherein sending the media presentation to a remote computing device comprises causing the media presentation to be published on a social networking site.

18. The system of claim 15, wherein the remote computing device is associated with a specified individual.

19. The system of claim 15, wherein the library of media elements is accessible over a network connection.

20. The system of claim 15, wherein the storyboard and the library of media elements are presented in the user interface simultaneously.

* * * * *